US012035863B2

(12) United States Patent
Patterson et al.

(10) Patent No.: US 12,035,863 B2
(45) Date of Patent: *Jul. 16, 2024

(54) MULTI-ORIENTATION CLEANING DEVICE

(71) Applicant: Unger Marketing International, LLC, Bridgeport, CT (US)

(72) Inventors: Joseph K. Patterson, Monroe, CT (US); Paul H. Adams, Monroe, CT (US); Stephen P. Huda, Shelton, CT (US); Christopher Joseph Carballo, Rye, NY (US)

(73) Assignee: Unger Marketing International, LLC, Bridgeport, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,386

(22) Filed: Sep. 19, 2022

(65) Prior Publication Data

US 2023/0015333 A1 Jan. 19, 2023

Related U.S. Application Data

(60) Division of application No. 17/168,539, filed on Feb. 5, 2021, now Pat. No. 11,589,725, which is a division (Continued)

(51) Int. Cl.

*A47L 13/22* (2006.01)
*A47L 13/254* (2006.01)

(Continued)

(52) U.S. Cl.

CPC ............ *A47L 13/22* (2013.01); *A47L 13/254* (2013.01); *A47L 13/256* (2013.01); *A47L 13/257* (2013.01); *A47L 13/26* (2013.01); *A47L 13/42* (2013.01); *A47L 13/44* (2013.01); *B05B 9/08* (2013.01); *B05B 12/002* (2013.01); *B05B 15/30* (2018.02); *B25G 1/04* (2013.01);

(Continued)

(58) Field of Classification Search

None

See application file for complete search history.

(56) References Cited

U.S. PATENT DOCUMENTS 2,104,161 A 12/1934 Koukal
4,776,716 A 10/1988 Huang (Continued)

FOREIGN PATENT DOCUMENTS

CA 2730814 A1 8/2011
CA 2834982 C 11/2012

(Continued)

OTHER PUBLICATIONS

HooverTwinTank_2011_Manual, 13 pages.

*Primary Examiner* — Eric W Golightly
(74) *Attorney, Agent, or Firm* — McCarter & English, LLP; Dave S. Christensen

(57) ABSTRACT

A cleaning device is provided. The cleaning device includes a power source and a pump in selective electrical communication with the power source. A storage container is provided. A valve assembly is disposed in the storage container and is in fluid communication with the pump. The valve assembly selectively flows cleaning fluid from a first portion and a second portion of the storage container. A cleaning element having a spray nozzle is in fluid communication with the pump.

20 Claims, 21 Drawing Sheets

Related U.S. Application Data of application No. 16/251,769, filed on Jan. 18, 2019, now Pat. No. 10,973,387, which is a continuation-in-part of application No. 16/032,846, filed on Jul. 11, 2018, now Pat. No. 10,881,264, and a continuation-in-part of application No. 15/849,797, filed on Dec. 21, 2017, now Pat. No. 10,470,638, which is a division of application No. 15/704,993, filed on Sep. 14, 2017, now Pat. No. 10,070,766, said application No. 15/849,797 is a division of application No. 14/983,883, filed on Dec. 30, 2015, now Pat. No. 9,877,631.

(60) Provisional application No. 62/452,891, filed on Jan. 31, 2017, provisional application No. 62/394,643, filed on Sep. 14, 2016, provisional application No. 62/185,382, filed on Jun. 26, 2015.

(51) Int. Cl.

| | |
|---|---|
| ***A47L 13/256*** | (2006.01) |
| ***A47L 13/257*** | (2006.01) |
| ***A47L 13/26*** | (2006.01) |
| ***A47L 13/42*** | (2006.01) |
| ***A47L 13/44*** | (2006.01) |
| ***B05B 9/08*** | (2006.01) |
| ***B05B 12/00*** | (2018.01) |
| ***B05B 15/30*** | (2018.01) |
| ***B25G 1/04*** | (2006.01) |
| ***B25G 3/38*** | (2006.01) |
| *B05B 1/30* | (2006.01) |
| *B05B 15/40* | (2018.01) |
| *B25G 1/10* | (2006.01) |
| *B65D 47/20* | (2006.01) |
| *B65D 75/58* | (2006.01) |

(52) U.S. Cl.

CPC .............. *B25G 3/38* (2013.01); *B05B 1/3006* (2013.01); *B05B 9/085* (2013.01); *B05B 9/0861* (2013.01); *B05B 15/40* (2018.02); *B25G 1/102* (2013.01); *B65D 47/20* (2013.01); *B65D 75/5883* (2013.01)

(56) References Cited

U.S. PATENT DOCUMENTS

| | | | |
|---|---|---|---|
| 4,863,299 | A | 9/1989 | Osberghaus |
| 5,271,682 | A | 12/1993 | Realdon |
| D361,669 | S | 8/1995 | Chan et al. |
| 5,515,574 | A | 5/1996 | Larson |
| 5,735,620 | A | 4/1998 | Ford |
| 5,771,535 | A | 6/1998 | Blessing |
| 5,875,527 | A | 3/1999 | Lacey et al. |
| 5,888,006 | A | 3/1999 | Ping |
| 6,142,750 | A | 11/2000 | Benecke |
| 6,468,624 | B1 | 10/2002 | Fujisawa et al. |
| 6,497,525 | B1 | 12/2002 | Huang |
| 6,540,424 | B1 | 4/2003 | Hall |
| 6,551,001 | B2 | 4/2003 | Aberegg |
| 6,579,023 | B2 | 6/2003 | Kunkler |
| 6,596,371 | B1 | 7/2003 | Billarant et al. |
| 6,612,768 | B2 | 9/2003 | Zorzo |
| D483,242 | S | 12/2003 | Heathcock |
| 6,655,866 | B1 | 12/2003 | Morad et al. |
| 6,659,670 | B1 | 12/2003 | Blouse |
| 6,663,306 | B2 | 12/2003 | Policicchio |
| 6,669,391 | B2 | 12/2003 | Policicchio |
| 6,722,806 | B2 | 4/2004 | Kunkler |
| 6,726,388 | B1 | 4/2004 | Monahan |
| 6,733,199 | B2 | 5/2004 | Dingert et al. |
| 6,854,911 | B2 | 2/2005 | Policicchio |
| 6,854,912 | B2 | 2/2005 | Dyer |
| 6,893,180 | B2 | 5/2005 | Hall |
| 6,899,485 | B2 | 5/2005 | Hall |
| 6,953,299 | B2 | 10/2005 | Wang |
| 6,960,042 | B1 | 11/2005 | Hsiao |
| 6,964,535 | B2 | 11/2005 | Bell |
| 6,981,533 | B2 | 1/2006 | Zorzo |
| 6,986,618 | B2 | 1/2006 | Hall |
| 6,986,619 | B2 | 1/2006 | Hall |
| 7,004,658 | B2 | 2/2006 | Hall |
| D520,852 | S | 5/2006 | Minkler |
| D520,854 | S | 5/2006 | Barrett |
| 7,048,458 | B2 | 5/2006 | Hall |
| 7,048,804 | B2 | 5/2006 | Kisela |
| 7,056,050 | B2 | 6/2006 | Sacks |
| 7,159,275 | B2 | 1/2007 | Chang |
| 7,160,044 | B2 | 1/2007 | Dyer |
| 7,163,349 | B2 | 1/2007 | Policicchio |
| 7,172,099 | B2 | 2/2007 | Hofte |
| 7,191,486 | B1 | 3/2007 | Michelson |
| 7,264,413 | B2 | 9/2007 | Vosbikian et al. |
| 7,281,915 | B2 | 10/2007 | Billarant |
| 7,431,524 | B2 | 10/2008 | Sacks |
| 7,530,136 | B1 | 5/2009 | Ball |
| 7,618,206 | B2 | 11/2009 | Sacks |
| 7,699,551 | B2 | 4/2010 | Suda |
| 7,708,485 | B2 | 5/2010 | Tanaka |
| 7,722,273 | B2 | 5/2010 | Tanaka |
| 7,779,501 | B2 | 8/2010 | Lacotta et al. |
| 7,818,850 | B2 | 10/2010 | Billarant |
| 7,841,039 | B1 | 11/2010 | Squire |
| 7,841,040 | B2 | 11/2010 | Strunk et al. |
| 7,850,384 | B2 | 12/2010 | Sacks |
| 7,854,035 | B2 | 12/2010 | Gullicks et al. |
| D632,090 | S | 2/2011 | Cobabe et al. |
| D632,490 | S | 2/2011 | Cobabe et al. |
| D632,491 | S | 2/2011 | Lowe |
| D633,362 | S | 3/2011 | Ayala |
| 7,981,822 | B2 | 7/2011 | Lester, Jr. et al. |
| D644,907 | S | 9/2011 | Blanchard |
| 8,060,973 | B2 | 11/2011 | Wildeman et al. |
| 8,069,520 | B2 | 12/2011 | Mattucci |
| 8,079,770 | B2 | 12/2011 | Widmer |
| 8,096,723 | B2 | 1/2012 | Bae |
| 8,109,685 | B1 | 2/2012 | Vito |
| D655,146 | S | 3/2012 | Lucio et al. |
| D661,036 | S | 5/2012 | Raven |
| 8,186,898 | B2 | 5/2012 | Bradbury |
| 8,205,288 | B2 | 6/2012 | Broman et al. |
| 8,205,293 | B2 | 6/2012 | Rosenzweig |
| 8,241,427 | B1 | 8/2012 | Crawford et al. |
| 8,245,351 | B2 | 8/2012 | Rosenzweig et al. |
| 8,267,607 | B2 | 9/2012 | Harris |
| D670,151 | S | 11/2012 | Angel |
| 8,261,402 | B2 | 11/2012 | Rosenzweig et al. |
| 8,321,990 | B2 | 12/2012 | Lee |
| 8,337,110 | B2 | 12/2012 | Rees et al. |
| 8,337,625 | B2 | 12/2012 | Gehm et al. |
| 8,402,588 | B2 | 3/2013 | Harris et al. |
| 8,425,137 | B1 | 4/2013 | Sampaio |
| 8,449,212 | B2 | 5/2013 | Crawford |
| 8,499,406 | B2 | 8/2013 | Fava |
| 8,590,096 | B2 | 11/2013 | Ravinett et al. |
| 8,596,896 | B2 | 12/2013 | Kimura |
| 8,641,309 | B2 | 2/2014 | Perry |
| 8,662,778 | B2 | 3/2014 | Crawford |
| 8,667,637 | B2 | 3/2014 | Vrdoljak |
| 8,677,552 | B2 | 3/2014 | Krebs |
| 8,719,990 | B2 | 5/2014 | Borofsky |
| D710,665 | S | 8/2014 | Boies |
| 8,807,858 | B2 | 8/2014 | Fitzpatrick |
| 8,834,053 | B2 | 9/2014 | Van Landingham, Jr. |
| 8,844,088 | B2 | 9/2014 | Garcia Castillo |
| D715,560 | S | 10/2014 | Li |
| 8,894,315 | B2 | 11/2014 | Dingert |
| 8,898,844 | B1 | 12/2014 | Dooley et al. |
| 8,926,210 | B2 | 1/2015 | Orubor |
| 8,927,480 | B2 | 1/2015 | Williams |
| 9,009,920 | B1 | 4/2015 | Ramsey |
| 9,044,132 | B2 | 6/2015 | Kaminer |
| D739,696 | S | 9/2015 | Miyazaki |

(56) References Cited

U.S. PATENT DOCUMENTS

| | | | |
|---|---|---|---|
| 9,138,120 | B2 | 9/2015 | Hsu |
| 9,138,257 | B2 | 9/2015 | Revivo |
| 9,339,165 | B2 | 5/2016 | Vetter et al. |
| 9,357,894 | B2 | 6/2016 | Chiu et al. |
| 9,386,896 | B2 | 6/2016 | Smith |
| 9,468,353 | B2 | 10/2016 | McBride, Jr. et al. |
| 9,526,303 | B2 | 12/2016 | Mahe |
| D778,068 | S | 2/2017 | Harrington |
| D789,637 | S | 6/2017 | Dobson, III |
| D789,764 | S | 6/2017 | Meier et al. |
| D793,640 | S | 8/2017 | Buckley et al. |
| 9,717,309 | B2 | 8/2017 | Marche et al. |
| D803,658 | S | 11/2017 | Perez et al. |
| 9,833,119 | B2 | 12/2017 | Thomas |
| 9,861,246 | B2 | 1/2018 | Bradbury et al. |
| 9,877,631 | B2 | 1/2018 | Patterson et al. |
| 9,936,847 | B2 | 4/2018 | Shin |
| 9,944,445 | B2 | 4/2018 | Altomare |
| 10,172,505 | B2 | 1/2019 | Tai et al. |
| 10,246,228 | B2 | 4/2019 | Meyers et al. |
| 10,406,548 | B2 | 9/2019 | Fujiwara et al. |
| 10,414,549 | B2 | 9/2019 | Hirst et al. |
| 10,881,264 | B2 | 1/2021 | Patterson et al. |
| 11,589,725 | B2 | 2/2023 | Patterson et al. |
| 2002/0166573 | A1 | 11/2002 | Policicchio et al. |
| 2003/0089383 | A1 | 5/2003 | Biggs |
| 2003/0103795 | A1 | 6/2003 | Hollars et al. |
| 2003/0126710 | A1 | 7/2003 | Policicchio |
| 2003/0204926 | A1 | 11/2003 | Jurgens |
| 2004/0146333 | A1 | 7/2004 | Fu |
| 2004/0223803 | A1 | 11/2004 | Fahy |
| 2005/0031404 | A1 | 2/2005 | Tsai et al. |
| 2005/0066465 | A1 | 3/2005 | Minkler et al. |
| 2005/0089360 | A1 | 4/2005 | Garabedian, Jr. |
| 2005/0144744 | A1 | 7/2005 | Thiess et al. |
| 2005/0191116 | A1 | 9/2005 | Flanery |
| 2005/0254882 | A1 | 11/2005 | Hofte et al. |
| 2006/0039743 | A1 | 2/2006 | Mensink |
| 2006/0110207 | A1 | 3/2006 | Augustinus Hofte et al. |
| 2006/0140703 | A1 | 6/2006 | Sacks |
| 2006/0213017 | A1 | 9/2006 | Bele |
| 2006/0222441 | A1 | 10/2006 | Tanaka et al. |
| 2007/0140774 | A1 | 6/2007 | Dyer |
| 2007/0231046 | A1 | 10/2007 | Whiffen |
| 2008/0038045 | A1 | 2/2008 | Hofte et al. |
| 2008/0040876 | A1 | 2/2008 | Aiyar |
| 2008/0066242 | A1 | 3/2008 | Aiyar |
| 2008/0115302 | A1 | 5/2008 | Kilkenny et al. |
| 2008/0205972 | A1 | 8/2008 | LaFlamme |
| 2009/0094791 | A1 | 4/2009 | Blom |
| 2010/0043167 | A1 | 2/2010 | Bradbury et al. |
| 2011/0158740 | A1 | 6/2011 | Kandasamy |
| 2012/0047677 | A1 | 3/2012 | Paliobeis et al. |
| 2012/0227763 | A1 | 9/2012 | Hayes |
| 2012/0311805 | A1 | 12/2012 | Hasegawa |
| 2013/0263396 | A1 | 10/2013 | Crawford |
| 2013/0263398 | A1 | 10/2013 | Irwin et al. |
| 2014/0041147 | A1 | 2/2014 | Pagoria et al. |
| 2014/0259510 | A1 | 9/2014 | Conrad |
| 2014/0317868 | A1 | 10/2014 | Fitzpatrick |
| 2015/0082570 | A1 | 3/2015 | Davidshofer |
| 2015/0089757 | A1 | 4/2015 | Davidshofer |
| 2015/0101140 | A1 | 4/2015 | Pierce |
| 2015/0201820 | A1 | 7/2015 | Escobar et al. |
| 2015/0272308 | A1 | 10/2015 | Harrington et al. |
| 2015/0297054 | A1 | 10/2015 | Weeks et al. |
| 2015/0305588 | A1 | 10/2015 | Dingert et al. |
| 2016/0029859 | A1 | 2/2016 | Harrington |
| 2016/0073847 | A1 | 3/2016 | Powell |
| 2016/0296089 | A1 | 10/2016 | Smith |
| 2016/0374532 | A1 | 12/2016 | Patterson et al. |
| 2017/0150864 | A1 | 6/2017 | Blom |
| 2017/0305608 | A1 | 10/2017 | Freulon et al. |
| 2018/0344124 | A1 | 12/2018 | Patterson |
| 2019/0159650 | A1 | 5/2019 | Patterson |
| 2019/0160480 | A1 | 5/2019 | Lee |
| 2023/0020360 | A1 | 1/2023 | Patterson et al. |

FOREIGN PATENT DOCUMENTS

| | | | |
|---|---|---|---|
| CA | 2893297 | | 6/2014 |
| CA | 2952203 | A1 | 12/2016 |
| CN | 201996475 | U | 10/2011 |
| CN | 104305932 | A | 1/2015 |
| CN | 110090750 | A | 8/2019 |
| CN | 110116064 | A | 8/2019 |
| CN | 107297295 | B | 10/2019 |
| CN | 209492872 | U | 10/2019 |
| CN | 209522097 | U | 10/2019 |
| EP | 1188406 | A2 | 3/2002 |
| EP | 1594387 | A2 | 11/2005 |
| EP | 2704848 | B1 | 3/2014 |
| EP | 3145382 | A1 | 3/2017 |
| JP | 06509439 | B2 | 5/2019 |
| JP | 06550302 | B2 | 7/2019 |
| JP | 06552287 | B2 | 7/2019 |
| WO | 2008103803 | A1 | 8/2008 |
| WO | 2014/090350 | A2 | 6/2014 |
| WO | 2014090350 | A2 | 6/2014 |
| WO | 2016209315 | A1 | 12/2016 |
| WO | 2018034731 | A1 | 2/2018 |
| WO | 2019098834 | A1 | 5/2019 |
| WO | 2019175016 | A1 | 9/2019 |

MULTI-ORIENTATION CLEANING DEVICE

CROSS REFERENCE TO RELATED APPLICATIONS

The present application is a divisional application of U.S. patent application Ser. No. 17/168,539, filed on Feb. 5, 2021, now U.S. Pat. No. 11,589,725. U.S. patent application Ser. No. 17/168,539, is a divisional application of U.S. patent application Ser. No. 16/251,769, filed on Jan. 18, 2019, now U.S. Pat. No. 10,973,387. U.S. patent application Ser. No. 16/251,769, is a continuation-in-part application of U.S. patent application Ser. No. 16/032,846, now U.S. Pat. No. 10,881,264, filed on Jul. 11, 2018, and a continuation-in-part of U.S. patent application Ser. No. 15/849,797, filed on Dec. 21, 2017, now U.S. Pat. No. 10,470,638. U.S. patent application Ser. No. 16/032,846, is a divisional application of U.S. patent application Ser. No. 15/704,993, filed on Sep. 14, 2017, now U.S. Pat. No. 10,070,766. U.S. patent application Ser. No. 15/704,993, claims the benefit of U.S. Provisional Application Ser. No. 62/394,643, filed on Sep. 14, 2016, and U.S. Provisional Application Ser. No. 62/452,891, filed on Jan. 31, 2017. U.S. patent application Ser. No. 15/849,797, is a divisional application of U.S. patent application Ser. No. 14/983,883, filed on Dec. 30, 2015, now U.S. Pat. No. 9,877,631. U.S. patent application Ser. No. 14/983,883, claims the benefit of U.S. Provisional Application 62/185,382, filed on Jun. 26, 2015. The contents of all of which are incorporated by reference herein in their entirety.

BACKGROUND

The present disclosure is related to cleaning devices. More particularly, the present disclosure is related to cleaning devices that spray cleaning fluids to assist the cleaning of hard surfaces.

Cleaning devices that allow for the cleaning of hard surfaces such as, but not limited to, window, walls, counters, floors, mirrors, tiles, tables, and others are known. Some prior art cleaning devices are also known to include cleaning fluid spraying systems—that allow the user to spray cleaning fluid onto the surface to be cleaned.

However, it has been determined by the present disclosure that such prior art cleaning devices are less than optimal.

Accordingly, there is a need for improved hard surface cleaning devices that improve upon, overcome, alleviate, and/or mitigate the deleterious effects and inefficiencies of prior art devices

BRIEF DESCRIPTION

According to one aspect of the disclosure a cleaning device is provided. The cleaning device includes a power source and a pump in selective electrical communication with the power source. A storage container is provided. A valve assembly is disposed in the storage container and in fluid communication with the pump, the valve assembly being configured to selectively flow cleaning fluid from a first portion and a second portion of the storage container. A cleaning element having a spray nozzle is in fluid communication with the pump.

In addition to one or more of the features described herein, or as an alternative, further embodiments of the device may include the valve assembly having a first fluid pathway in fluid communication with the first portion and a second fluid pathway in fluid communication with the second portion. In addition to one or more of the features described herein, or as an alternative, further embodiments of the device may include a first valve fluidly coupled to the first fluid pathway between the first portion and the pump, the first valve being configured to selectively fluidly couple the first portion to the pump based at least in part on the orientation of the device. In addition to one or more of the features described herein, or as an alternative, further embodiments of the device may include the first valve fluidly couples the first portion to the pump when the first portion is vertically lower than the second portion.

In addition to one or more of the features described herein, or as an alternative, further embodiments of the device may include the first valve fluidly decoupling the first portion from the pump when the first portion is vertically higher than the second portion. In addition to one or more of the features described herein, or as an alternative, further embodiments of the device may include a vent member fluidly coupled between an interior portion of the storage container and an ambient environment. In addition to one or more of the features described herein, or as an alternative, further embodiments of the device may include the vent member selectively flowing air into the interior environment in response to activation of the pump.

In addition to one or more of the features described herein, or as an alternative, further embodiments of the device may include the storage container including a removable cap, the cap being sealingly coupled to the storage container. In addition to one or more of the features described herein, or as an alternative, further embodiments of the device may include the storage container being removably coupled to the pump. In addition to one or more of the features described herein, or as an alternative, further embodiments of the device may include the storage container being refillable by the end user. In addition to one or more of the features described herein, or as an alternative, further embodiments of the device may include the storage container being made from a substantially rigid material. In addition to one or more of the features described herein, or as an alternative, further embodiments of the device may include a tube fixedly coupled between the storage container and the pump to define a flow path therebetween.

According to another aspect of the disclosure a method of cleaning a surface is provided. The method includes providing a storage container, a cleaning head and a pump that are connected to one another. Cleaning fluid is flowed through a first fluid pathway when the storage container is in a first orientation. Cleaning fluid is flowed through a second fluid pathway when the storage container is in a second orientation. Cleaning fluid is flowed from the first fluid pathway or the second fluid pathway to the cleaning head.

In addition to one or more of the features described herein, or as an alternative, further embodiments of the method may include the storage container being in a first orientation when the cleaning fluid flows through the first fluid pathway and is in a second orientation when the cleaning fluid flows through the second fluid pathway, the first orientation being different than the second orientation.

In addition to one or more of the features described herein, or as an alternative, further embodiments of the method may include closing a valve in the first fluid pathway when the storage container is in the second orientation. In addition to one or more of the features described herein, or as an alternative, further embodiments of the method may include refilling the storage container with cleaning fluid. In addition to one or more of the features described herein, or as an alternative, further embodiments of the method may include fluidly decoupling the storage container from the pump before refilling the storage container.

According to yet another aspect of the disclosure a cleaning device is provided. The device including a power source and a pump in selective electrical communication with the power source. A storage container is in fluid communication with the pump. A cleaning head having a first opening and a spray nozzle is provided, the spray nozzle being in fluid communication with the pump, the spray nozzle being disposed to direct cleaning fluid through the opening. An adapter member is removably coupled to the cleaning head. A cleaning element is removably coupled to the adapter member.

In addition to one or more of the features described herein, or as an alternative, further embodiments of the device may include the adapter member having a hook and loop fastener, the cleaning element being removably coupled to the adapter member via the hook and loop member. In addition to one or more of the features described herein, or as an alternative, further embodiments of the device may include the cleaning element being a disposable cleaning element.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
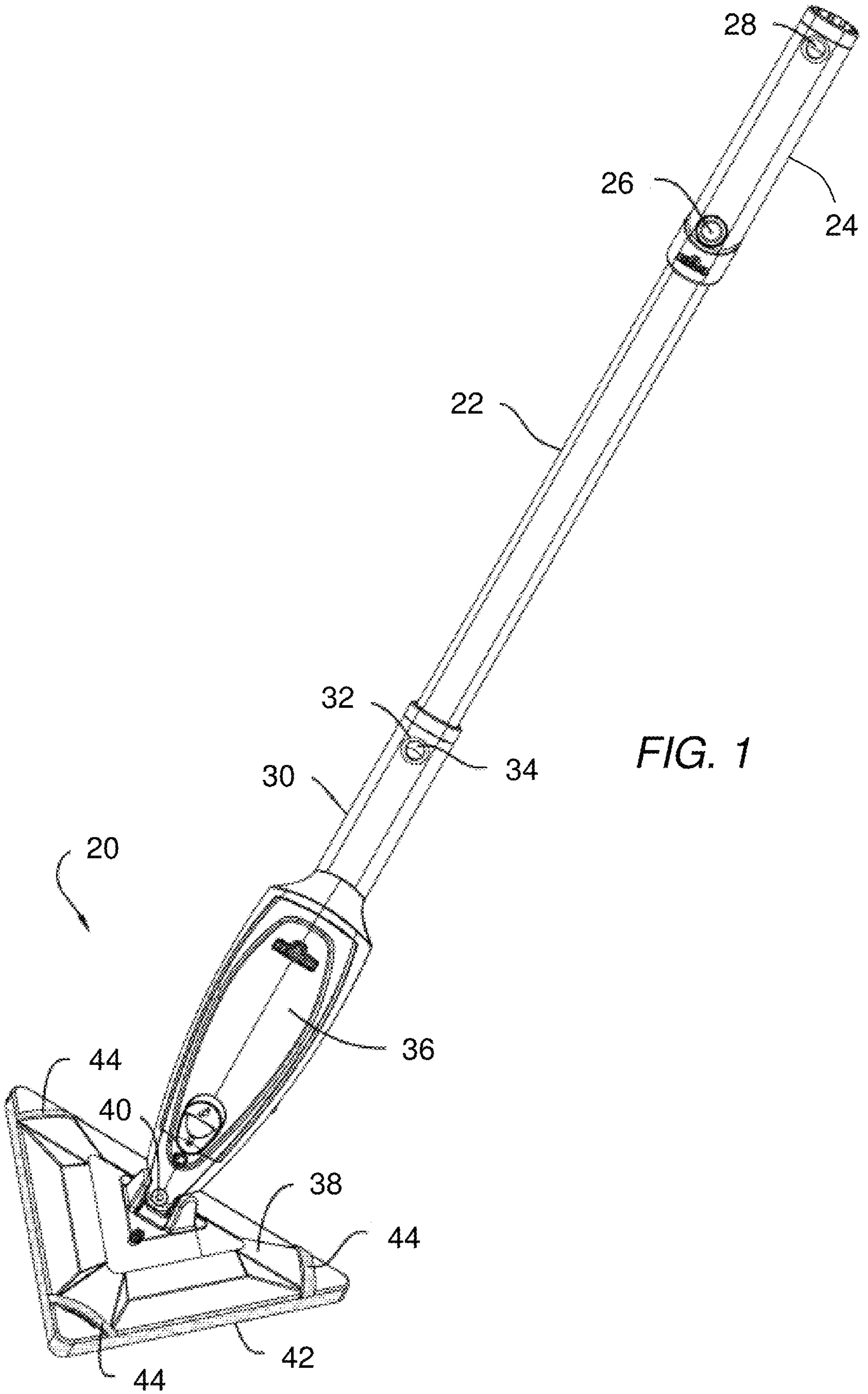
FIG. 1 is a perspective view of a cleaning device according to an embodiment.
Figure 2:
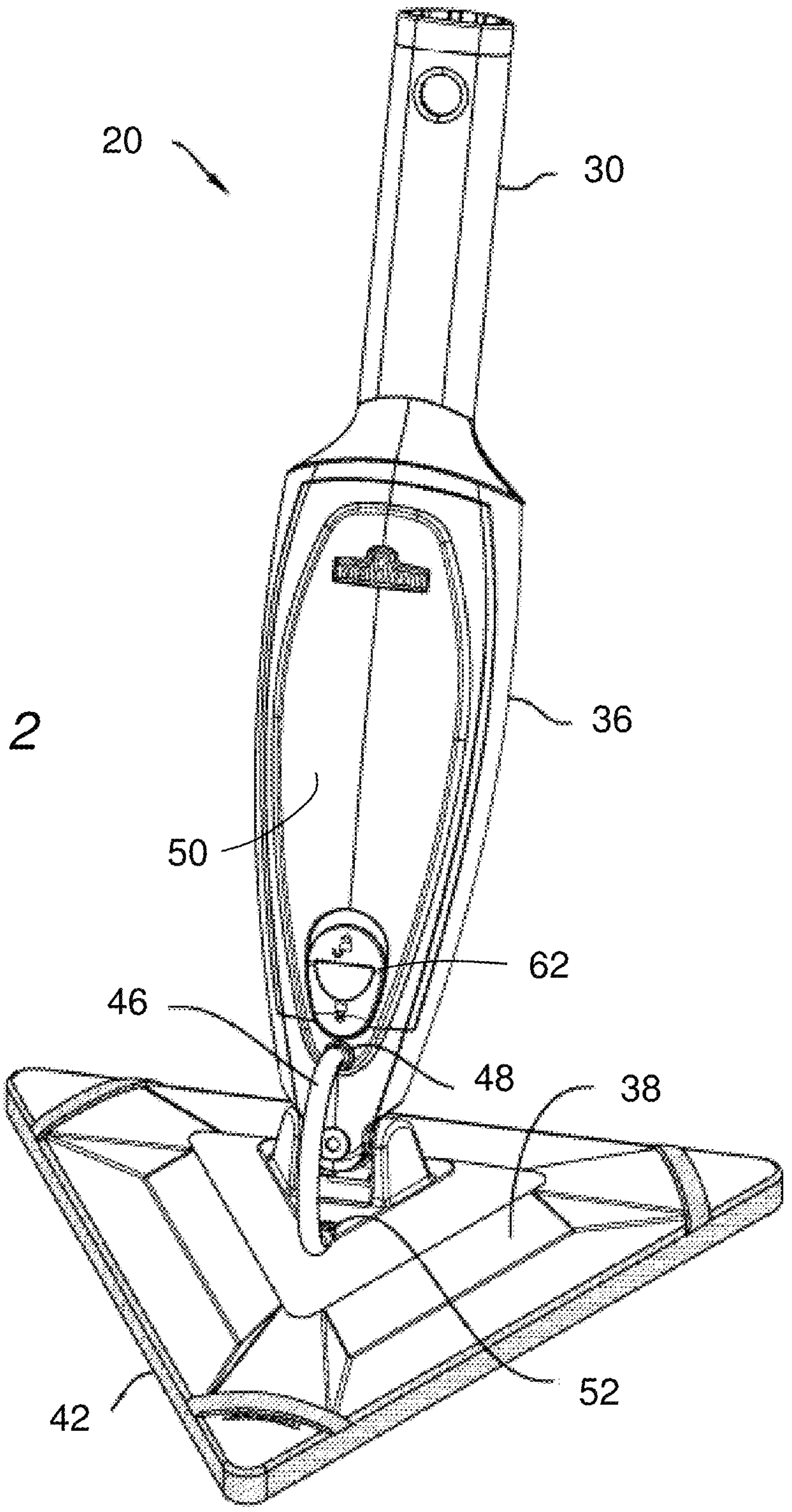
FIG. 2 is an enlarged perspective view of a portion of the cleaning device of FIG. 1.
Figure 3:
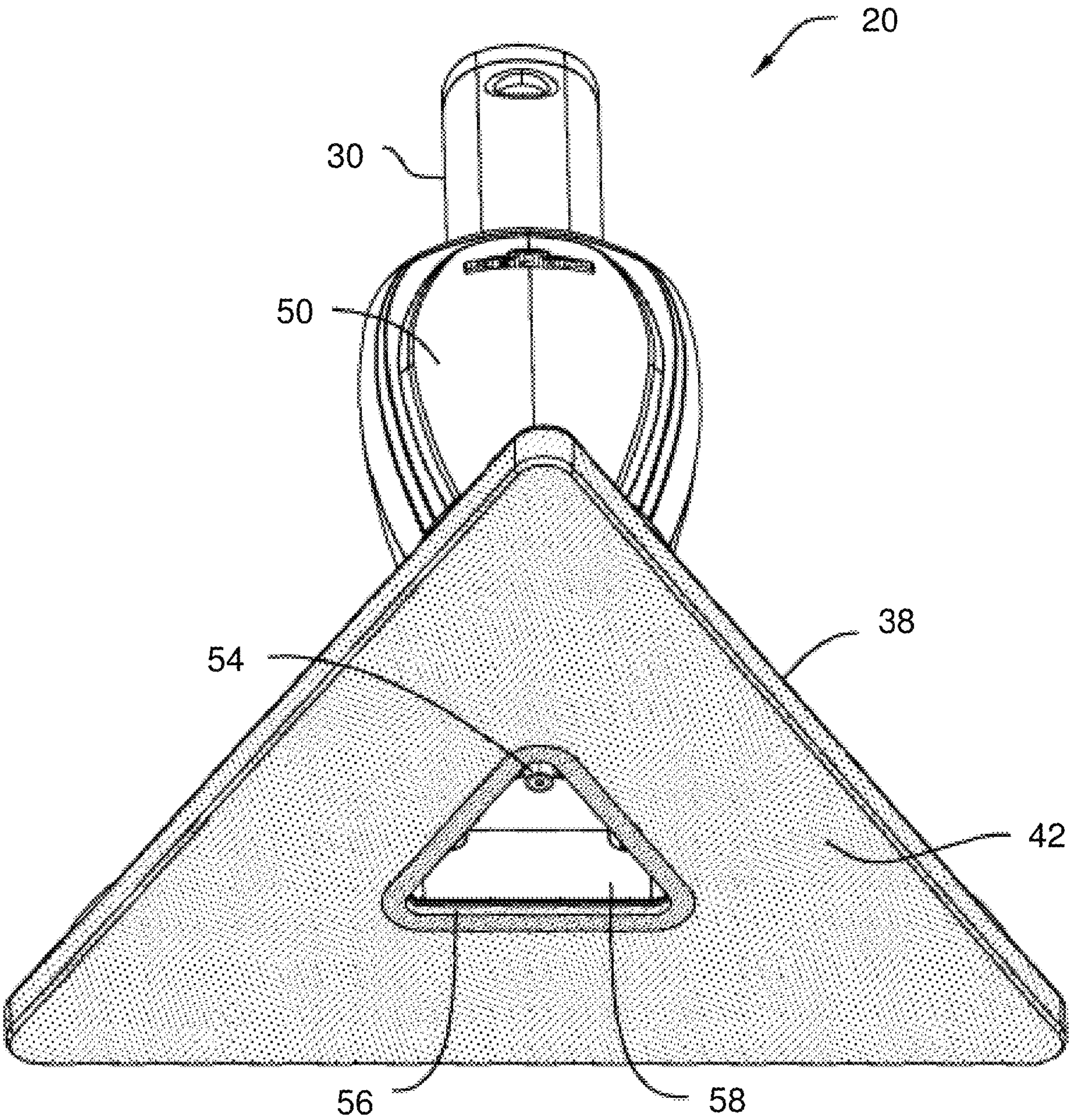
FIG. 3 is an enlarged bottom perspective view of a portion of the cleaning device of FIG. 1.
Figure 4:
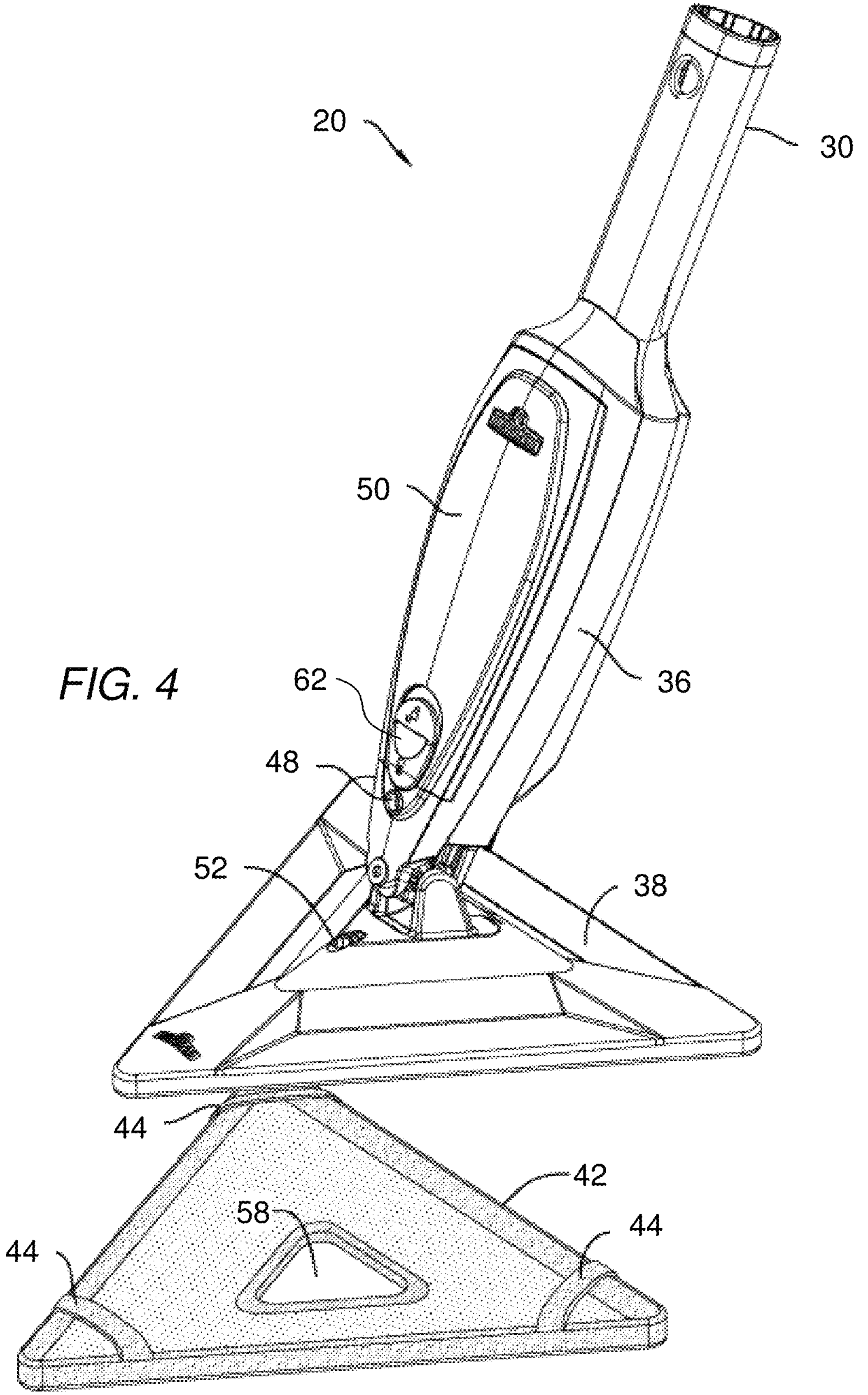
FIG. 4 is a partially disassembled view of the cleaning device of FIG. 1.
Figure 5:
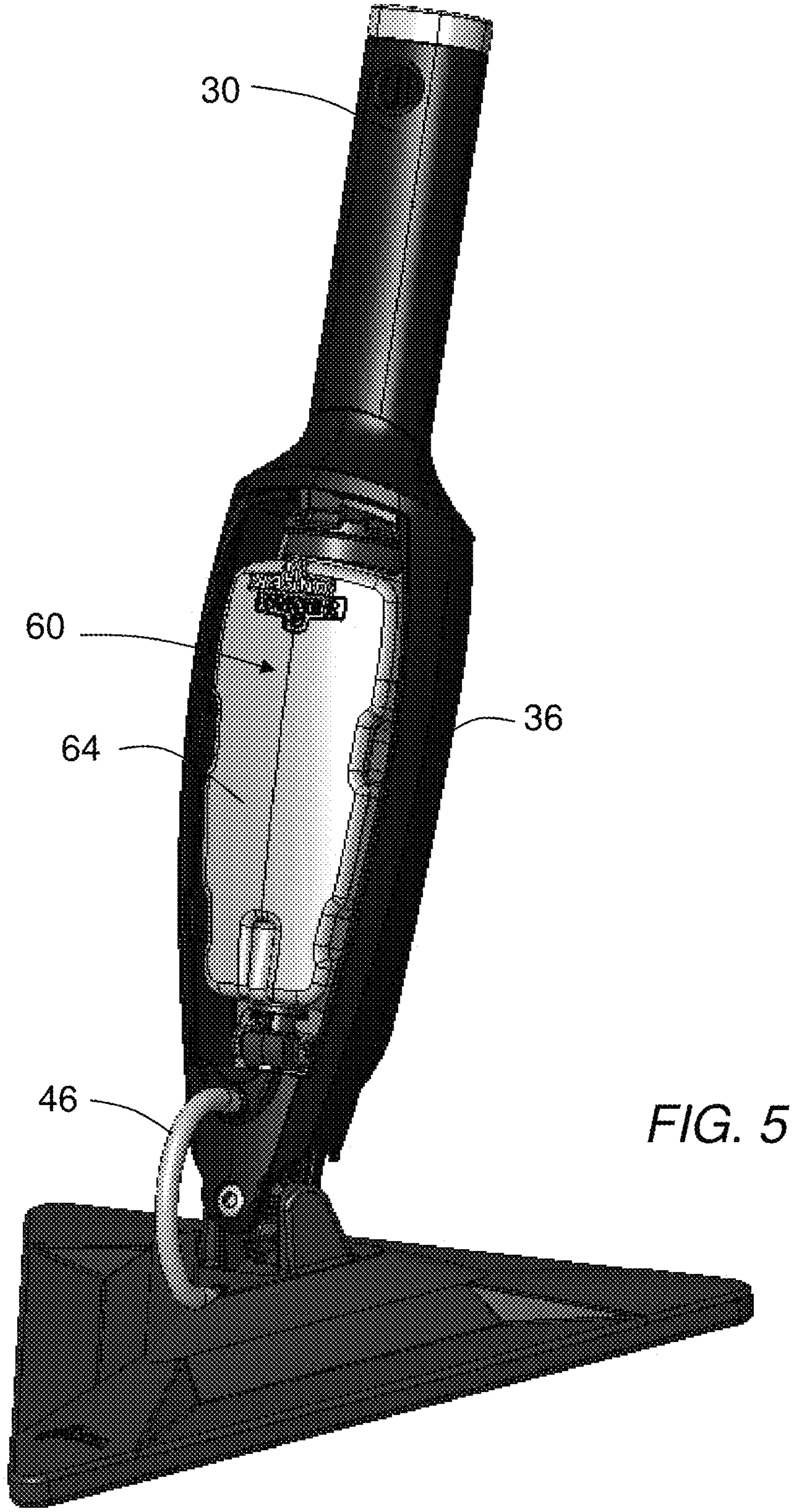
FIG. 5 is an enlarged perspective view of the cleaning device of FIG. 1 with a cover removed, in accordance with an embodiment.
Figure 6:
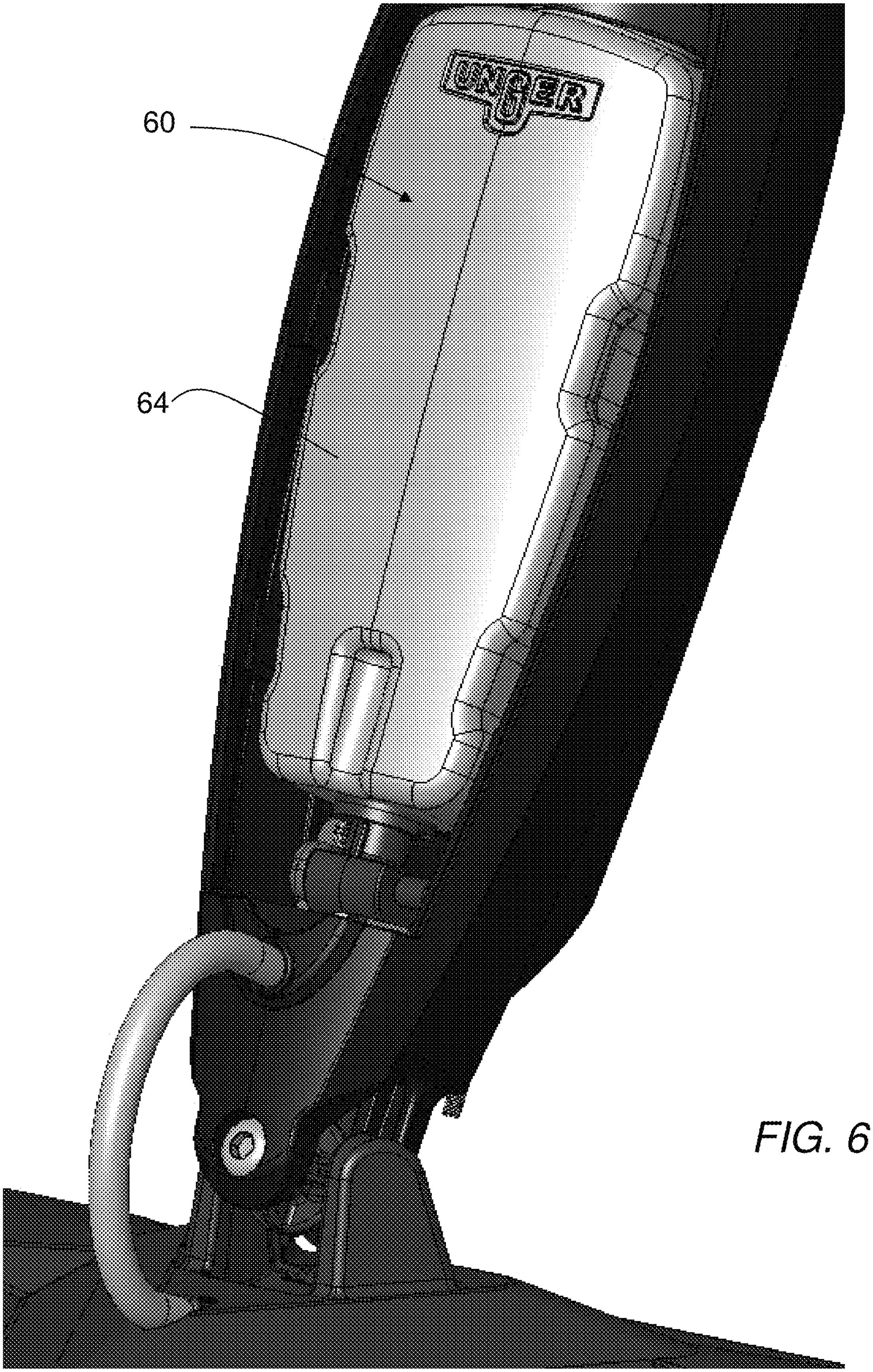
FIG. 6 is an enlarge perspective view of the cleaning device of FIG. 5.
Figure 7:
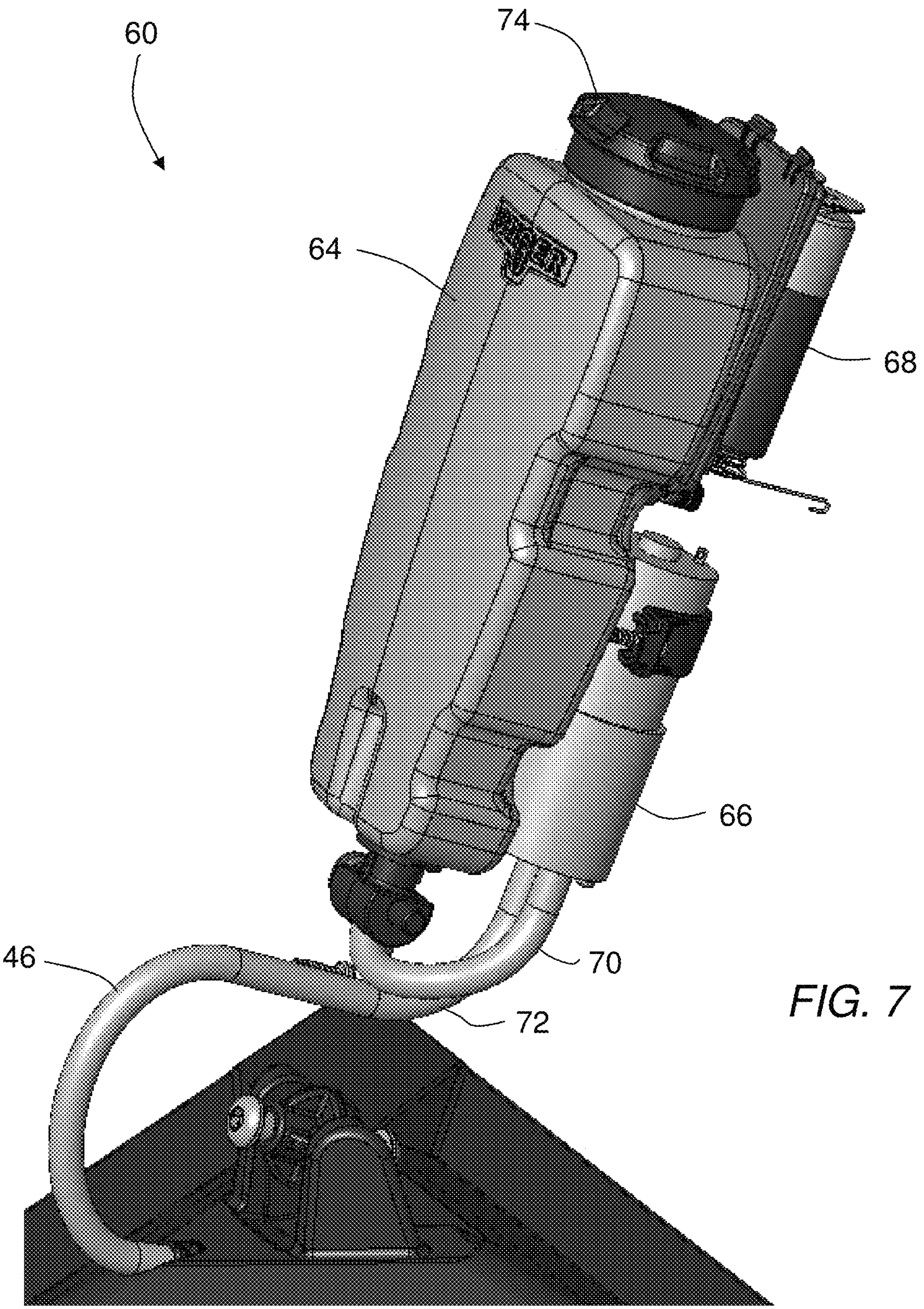
FIG. 7 is a partial perspective view of a cleaning fluid storage and dispensing assembly for the cleaning device of FIG. 1, in accordance with an embodiment.
Figure 8:
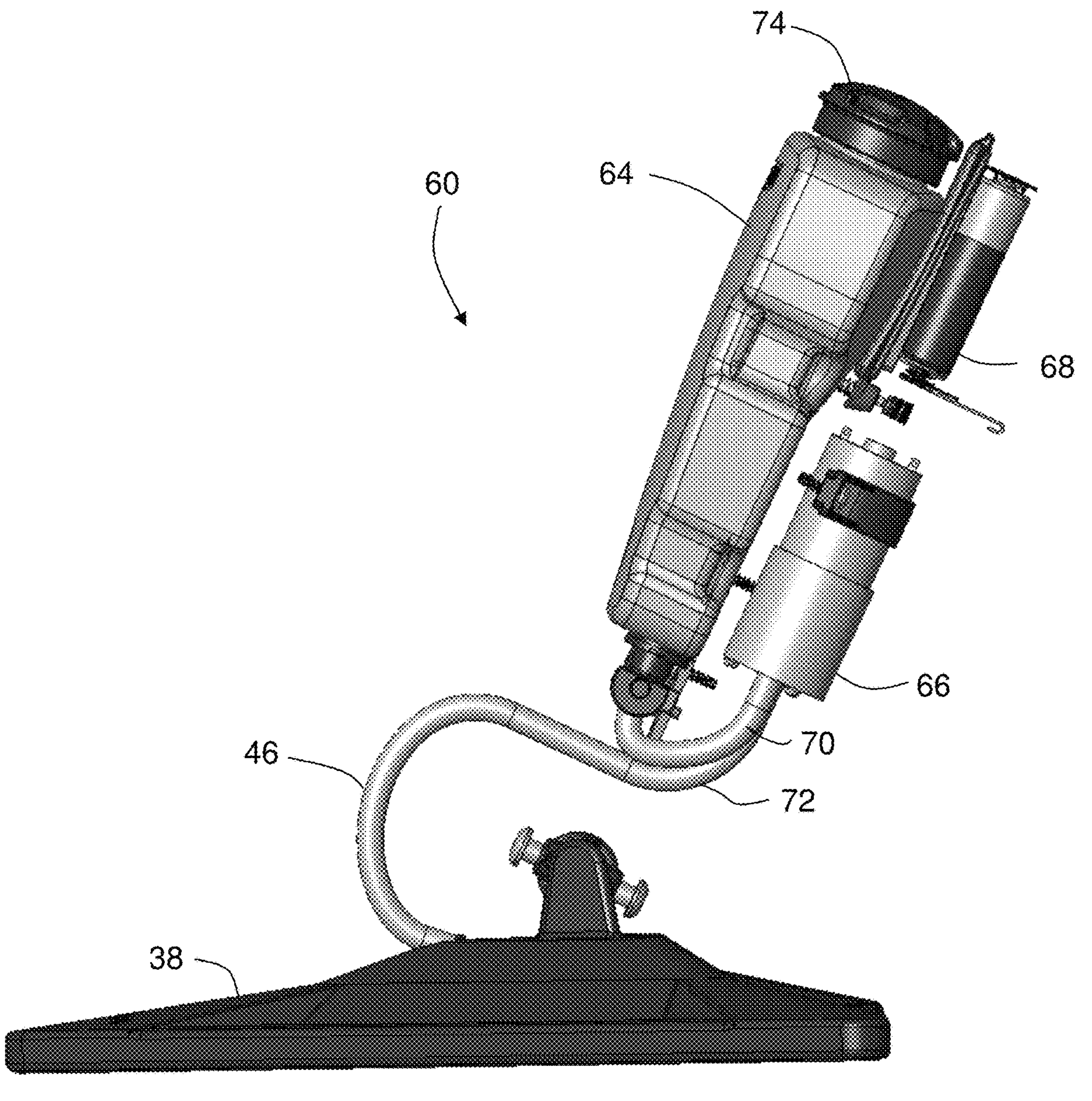
FIG. 8 is a side view of the cleaning fluid storage and dispensing assembly of FIG. 7.
Figure 9A:
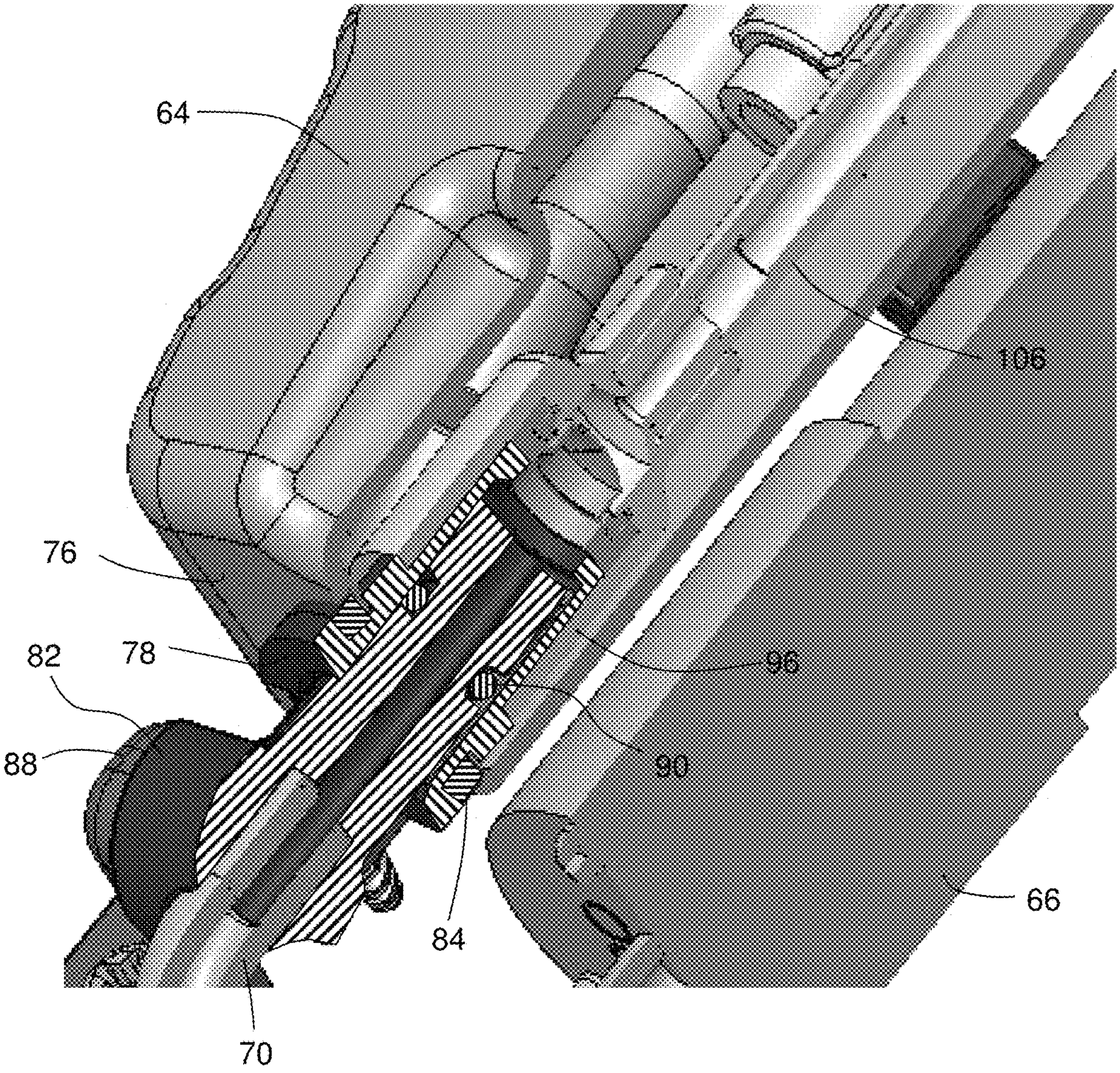
FIG. 9A is a perspective view, partially in section of the cleaning fluid storage and dispensing assembly of FIG. 7.
Figure 9B:
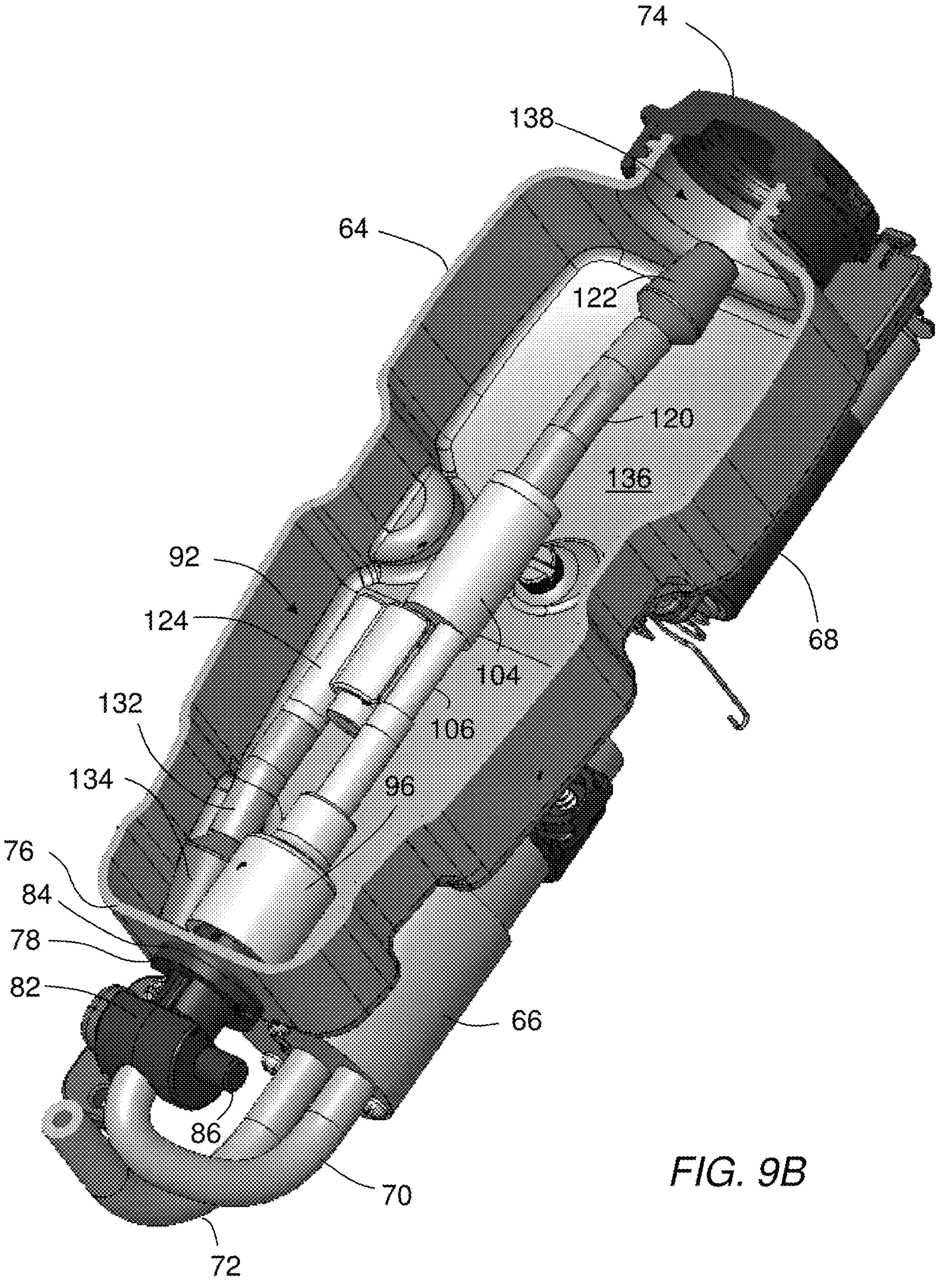
FIG. 9B is a perspective view, partially in section of the cleaning fluid storage and dispensing assembly of FIG. 7.

The detailed description explains embodiments of the disclosure, together with advantages and features, by way of example with reference to the drawings.

DETAILED DESCRIPTION

Embodiments of the present disclosure provide for a cleaning device that can be operated in multiple orientations, including on a floor, a window, a wall, and/or the ceiling. In one or more embodiments provided herein, the cleaning device includes a substantially rigid cleaning fluid container. In one or more embodiments, the substantially rigid cleaning fluid container is refillable. In one or more embodiments, the substantially rigid cleaning fluid container is translucent, allowing the user to see how much cleaning fluid remains.

Referring now to FIGS. 1-4, an embodiment of a cleaning device 20 is shown that may be used for cleaning surfaces, such as but not limited to floors, tabletops, counters, windows, walls and ceilings for example. The device 20 includes a handle or pole 22. The pole 22 has a handle end 24, which can include one or more actuators 26 and/or pole connectors 28. In some embodiments, there may be one or more additional actuators (not shown) on the device 20, such as on a housing 36 for example. The pole 22 may be extendable in a similar manner to that described in commonly-owned U.S. patent application Ser. No. 16/032,846 entitled "Hard Surface Cleaning Devices" filed on Jul. 11, 2018, the contents of which is incorporated by reference herein. The pole 22 is coupled to a dispensing section 30. In an embodiment, the pole 22 includes a lock member 32 and the dispensing section 30 includes a locking opening 34. The engagement of the lock member 32 in the locking opening 34 secures the pole 22 to the dispensing section 30.

Figure 19:
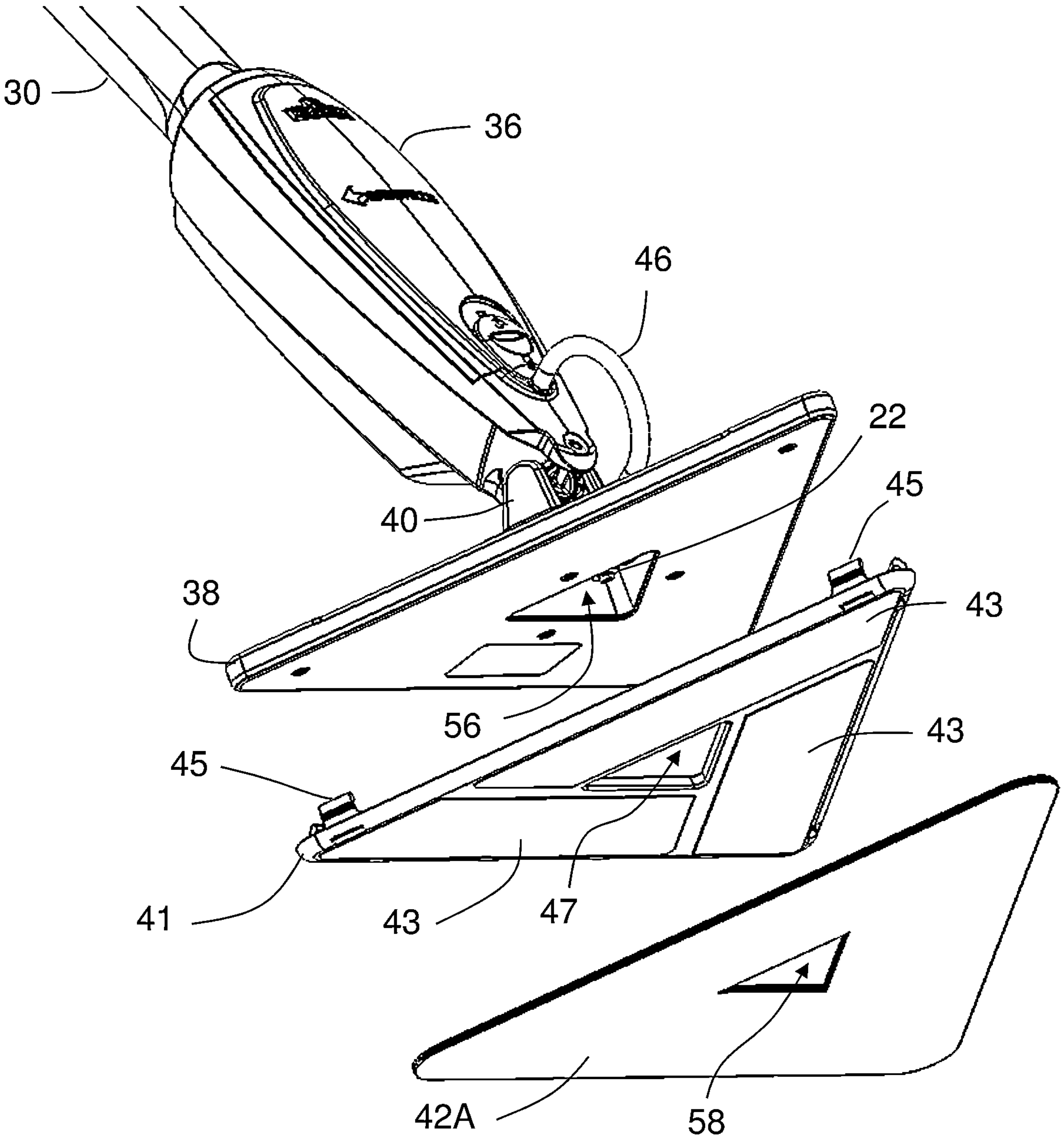
FIG. 19 and FIG. 20 are perspective views of a cleaning device with an adapter plate in accordance with an embodiment.
Figure 20:
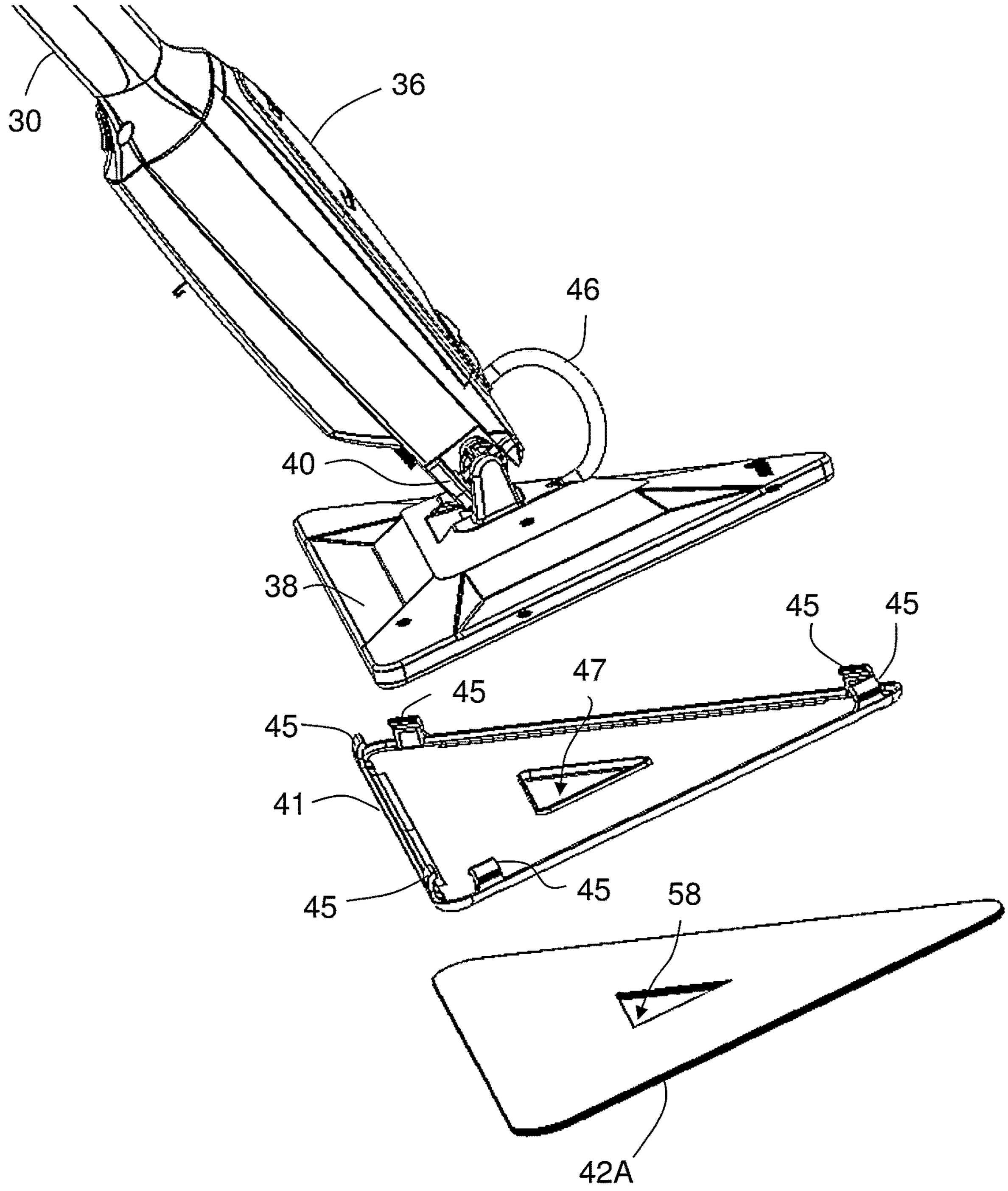

The dispensing section 30 includes the housing 36. As will be discussed in more detail herein, the housing 36 contains a cleaning fluid storage and dispensing assembly. In an embodiment, the cleaning fluid storage and dispensing assembly is operably coupled to the actuator 26 and any other actuators on the device 20 for causing the cleaning fluid storage and dispensing assembly to dispense cleaning fluid during operation. The dispensing section 30 is connected to a cleaning head 38 by a connector 40. The connector 40 may be any suitable hinged attachment that allows the head 38 to rotate about a single or two orthogonal axis during operation. A cleaning element 42 couples to the head 38. The element 42 may connect with the head 38 via straps 44, or by other suitable means, such as a hook and loop fastener for example. The cleaning element 42 may be a cleaning pad made from a suitable material, such as but not limited to microfiber, cotton, wool, non-woven fibers, or any combination thereof. The cleaning element 42 may further include other elements, such as but not limited to brush bristles, a squeegee, a scraper, or any other cleaning element or combinations thereof. In an embodiment, an adapter plate 41 (FIG. 19) may be provided that allows the user to switch between a cleaning element 42A that uses straps 44 and a cleaning element 42 that uses hook and loop fasteners 43. In an embodiment, the adapter plate 41 includes tabs 45 that couple with the cleaning head 38, such as by engaging around the edge of the cleaning head 38 with one or more snapfits. The adapter plate 41 also includes an opening 47 that allows cleaning fluid from the nozzles to be directed therethrough. In some embodiments, the cleaning element 42A is a disposable cleaning element that is intended to be discarded. In other embodiments, the cleaning element 42, 42A is re-usage and is washable when it accumulates debris.

The dispensing section 30 is further fluidly coupled to the head 38 by a conduit or dispensing tube 46 that exits an outlet 48 below removable cover 50 in the housing 36. As will be discussed in more detail herein, the tube 46 couples with a pump and provides a fluid pathway for transferring cleaning fluid to the head 38. The tube 46 connects with a spray nozzle 54 via an inlet 52. In the illustrated embodiment, the head 38 and the cleaning element 42 each include a central opening 56, 58 respectively. The nozzle 54 is recessed with respect to the bottom surface of the head 38, which offsets the nozzle from the cleaning surface to facility distribution of the cleaning fluid and prevent the nozzles from being damaged during use.

Without wishing to be bound by any particular theory, it is believed that device 10—by capturing the spray of the cleaning fluid between head 38 and the surface being cleaned—prevents airborne cleaning fluid from being present in the air near the user's mouth and nose, particularly as the device is held at or above head level while cleaning windows, mirrors, and the like. In the example where device 20 is used in window cleaning, the cleaning fluid often includes chemicals with a viscosity low enough to be formed into a mist—namely atomized or formed into an aerosol—by the spraying through nozzles 54. When prior art window cleaning devices are used to clean items at or above the user's mouth and nose, the atomized cleaning fluid can disadvantageously pass through the breathing space—an outcome that device 20 reduces by constraining the spray of the cleaning fluid between head 38 and the surface being cleaned.

As discussed herein, the device 20 is configured to pump cleaning fluid from container 60 to one or more spray nozzles 54 (one shown) directly onto the surface being cleaned. Here, central opening 56 that is in alignment or registration with an opening 58 in the cleaning member 42, 42A (and the adapter plate 41 in some embodiments) so that spray nozzles 54 spray the cleaning fluid through the openings onto the surface being cleaned. Without wishing to be bound by any particular theory, head 38 defines a chamber around nozzles 54 and positions the nozzles 54 a predefined distance from the surface being cleaned. In an embodiment, device 20 is configured to capture any spray of the cleaning fluid within head 38 and is particularly configured to ensure coverage of the surface being cleaned by allowing the spray from the nozzles 54 to have sufficient space, volume, or time to form larger droplets until all the chemical is on the surface being clean.

It has been determined by the present disclosure that, in some embodiments, there is a relationship between the height of nozzle 54 from the surface being cleaned (measured to the surface of the pad) and the volume of the chamber, examples of which are illustrated in Table 1.

TABLE 1

COMPARISON OF NOZZLE HEIGHT AND CHAMBER VOLUME

| Example No. | Approx Nozzle height from Pad surface (mm) | Approx chamber volume around nozzle (cc) |
|---|---|---|
| 1 | 3.75 | 37 |
| 2 | 7 | 10 |
| 3 | 25 | 10 |

Referring now to FIGS. 5-9B, an embodiment is shown of the cleaning fluid storage and dispensing assembly 60. The assembly 60 is disposed within the housing 36 and is accessed by the user via the removable cover 50. In the illustrated embodiment, the cover 50 is removed through the actuation of a latch 62. The assembly 60 includes a storage container 64, a pump 66 and a power source 68. An outlet tube 70 defines a fluid pathway from the container 64 to the pump 66. An outlet tube 72 defines a fluid pathway from the pump 66 to the dispensing tube 46. It should be appreciated that in some embodiments, the dispensing tube 46 and the outlet tube 72 may be a single conduit. The storage container 64 is made from a substantially rigid material and includes a removable cover 74. It should be appreciated that the cover 74 allows the container 64 to be easily refilled. In an embodiment, the container 64 is made from a translucent material to allow the user to view how much cleaning solution remains in the container 64. The cover 74 may include a seal that engages a portion of the container 64 to prevent fluid from leaking.

The opposite end 76 of the container 64 includes a output cap 78 having an opening 80 (FIG. 10) sized to receive a pivot arm 82. An optional seal 84 is disposed between the output cap 78 and the container 64 to provide a seal therebetween. In an embodiment, the pivot arm 82 includes a trunnion 86 that engages a bearing surface in the housing assembly 88 that allows the container 64 to pivot. It should be appreciated that pivoting the container 64 from the operating position (as shown) to a more outward orientation facilitates the insertion and removal of the container 64 from the system 20. In the illustrated embodiment, the output cap 78 further includes a second seal, such as o-ring 90 for example. The o-ring 90 forms a seal between the inner surface of opening 80 and the output cap 78 to prevent fluid from leaking from the container 64.

The container 64 includes a valve assembly 92 as shown in FIGS. 9A-16. The valve assembly 92 is coupled to the container housing through a tab 94 on the output cap 78. In an embodiment, the container housing includes a hole on the end 76 that includes a pair of slots (not shown). To couple the pivot arm 82 to the storage container 64, the seal 90 is positioned on the output cap 78 and the tabs 94 interlock with the slots. Coupled to the output cap 78 is a valve housing 96. The valve housing 96 has a generally cylindrical shape with an opening 98 sized to receive the output cap 78. In an embodiment, the outer diameter of the output cap 78 is press fit into the opening 98 to secure the output cap 78 to the container housing. The compression of the output cap 78 forms a seal with the container 64. Also disposed within the opening 98 is a disk valve 102 held in place by a locking ring 100. As will be discussed in more detail herein, the disk valve 102 is a normally closed valve that prevents cleaning solution from flowing from the container 64. The disk valve 102 automatically opens in response to operation of the pump 66. In an embodiment, the disk valve 102 includes a flexible member 103 (FIG. 13) having a one or more slits 105. The flexible member 103 deflects in response to pressure from the activation of the pump 66. The deflection of the flexible member 103 opens the slits 105 allows fluid from the container 64 to flow into the outlet tube 70 through the pivot arm 82.

Figure 15A:
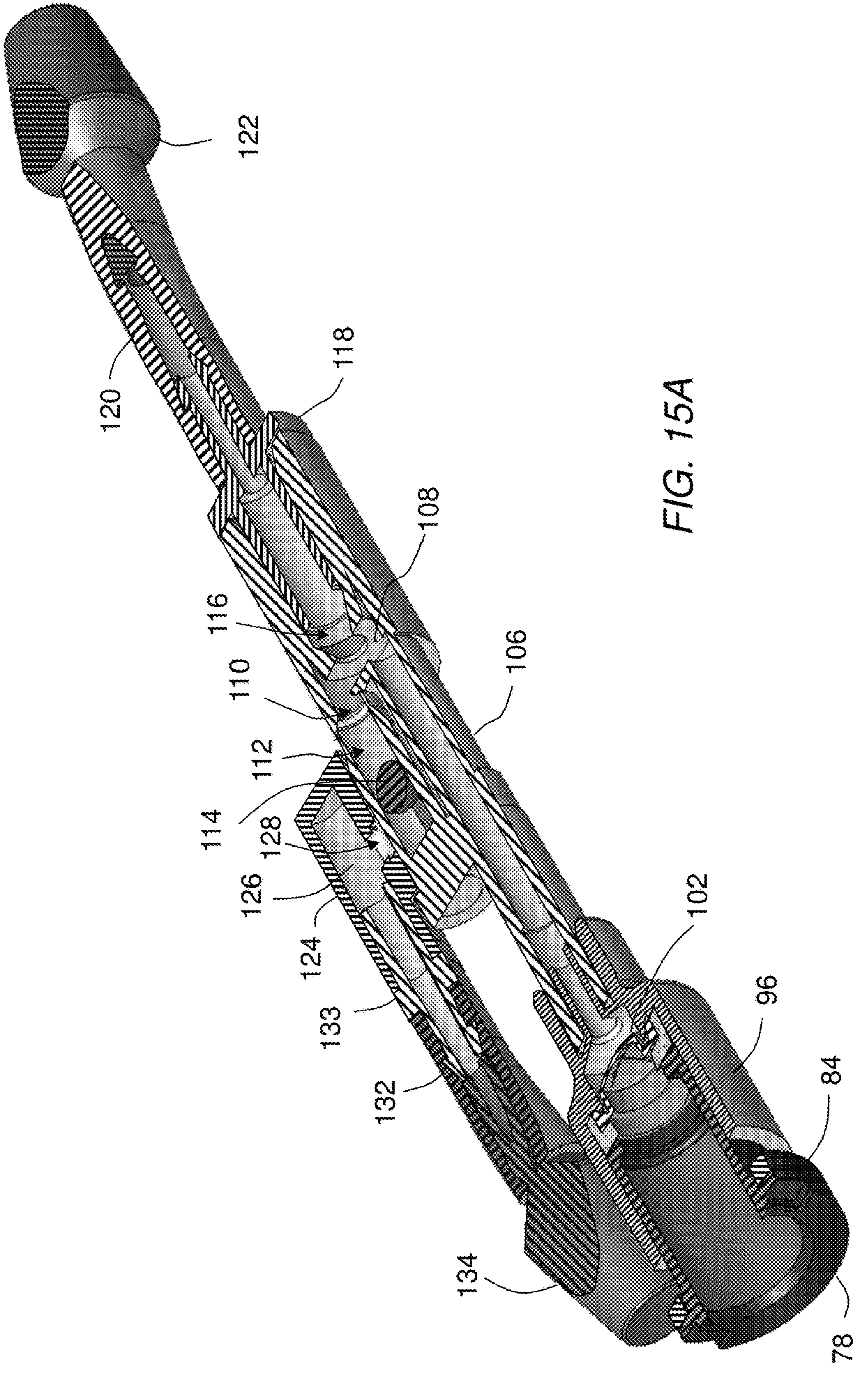
FIG. 15A is a sectional view of the storage container valve assembly of FIG. 11.

Coupled to the valve housing 96 is a directional flow valve 104. The flow valve 104 includes a conduit 106 that is sized to be received in the end of the valve housing 96. The conduit 106 fluidly couples the valve housing 96 to a directional chamber 108 (FIG. 15). The directional chamber 108 also has a second inlet 110 that is fluidly coupled to a ball valve chamber 112. The ball valve chamber 112 includes a spherical member 114 that freely moves along the length of the ball valve chamber 112 based on the orientation of the valve assembly 92. The directional chamber 108 further includes a port 116. The port 116 receives and couples to a first tube adapter 118. Coupled to an opposite side of the first tube adapter 118 is a first take-up tube 120. Coupled to the opposite end of the first take-up tube 120 is a first filter 122. It should be appreciated that a first fluid path is defined from the interior of the container 64 to the disk valve 102 by the first filter 122, first take-up tube 120, the port 116, the directional chamber 108 and the conduit 106.

Fluidly coupled to the ball valve chamber 112 is an input tube member 124. The input tube member 124 includes an input chamber 126 that is selectively fluidly coupled to the ball valve chamber 112 via a passageway 128. In an embodiment, the passageway 128 is fluidly coupled to a pair of inlets 130 (FIG. 16) arranged on one end of the ball valve chamber 112. The inlets 130 have a length that is larger than the diameter of the spherical member 114. In some embodiments, an additional seal (not shown) may be disposed between input tube member 124 and the housing of ball valve chamber 112. It should be appreciated that as the spherical member 114 moves within the ball valve chamber 112, a fluid pathway may be formed between the input chamber 126 and the directional chamber 108 based on the position of the spherical member 114. When the valve assembly 92 is in a first position (e.g. with the cleaning element vertically above the container 64), the spherical member 114 will move against the second inlet 110 as shown in FIG. 15C to block fluid flow from the ball valve chamber 112 to the directional chamber 108 creating a fluid pathway 123 from the filter 122 to the disk valve 102. With the valve assembly is in a second position (e.g. with the cleaning element vertically below the container 64), the spherical member 114 will move to an opposite end of the ball valve chamber as shown in FIG. 15B creating a fluid pathway from the input chamber 126 to the directional chamber 108 via the passageway 128 and inlets 130.

Coupled to the input tube member 124 is a second take-up tube 132 via a second tube adapter 133. Coupled to an opposite end of the second take-up tube 132 is a second filter 134. It should be appreciated that when the valve assembly 92 is in the second position as shown in FIG. 15B (e.g. the inlets 130 are in fluid communication with the directional chamber 108), a second fluid pathway 135 is defined from the interior of the container 64 to the disk valve 102 by the second filter 134, second take-up tube 132, the input chamber 126, the passageway 128, the inlets 130, the ball valve chamber 112, through inlet 110, the directional chamber 108, and the conduit 106.

Figure 15B:
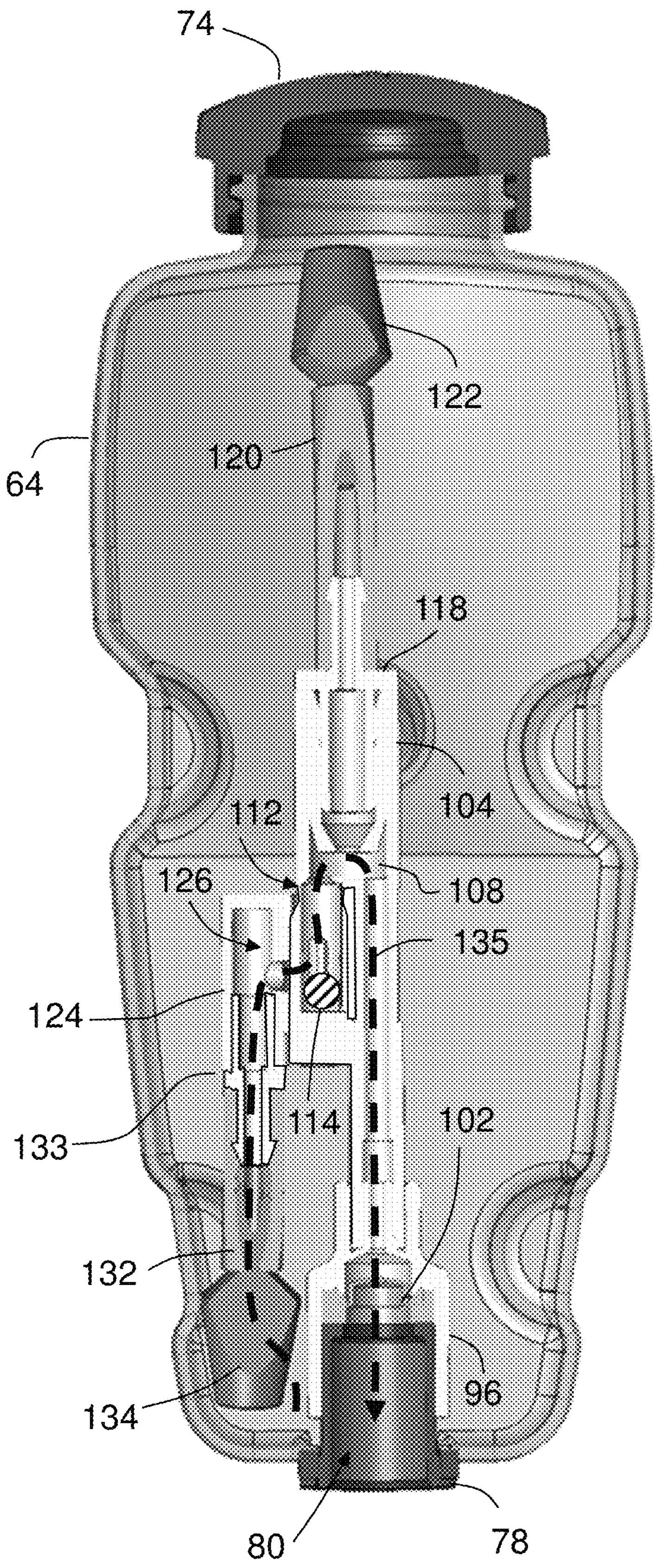
FIG. 15B is a sectional view of the storage container oriented in a position (cleaning element vertically lower) where the cap of the storage container is vertically higher than the output cap.
Figure 15C:
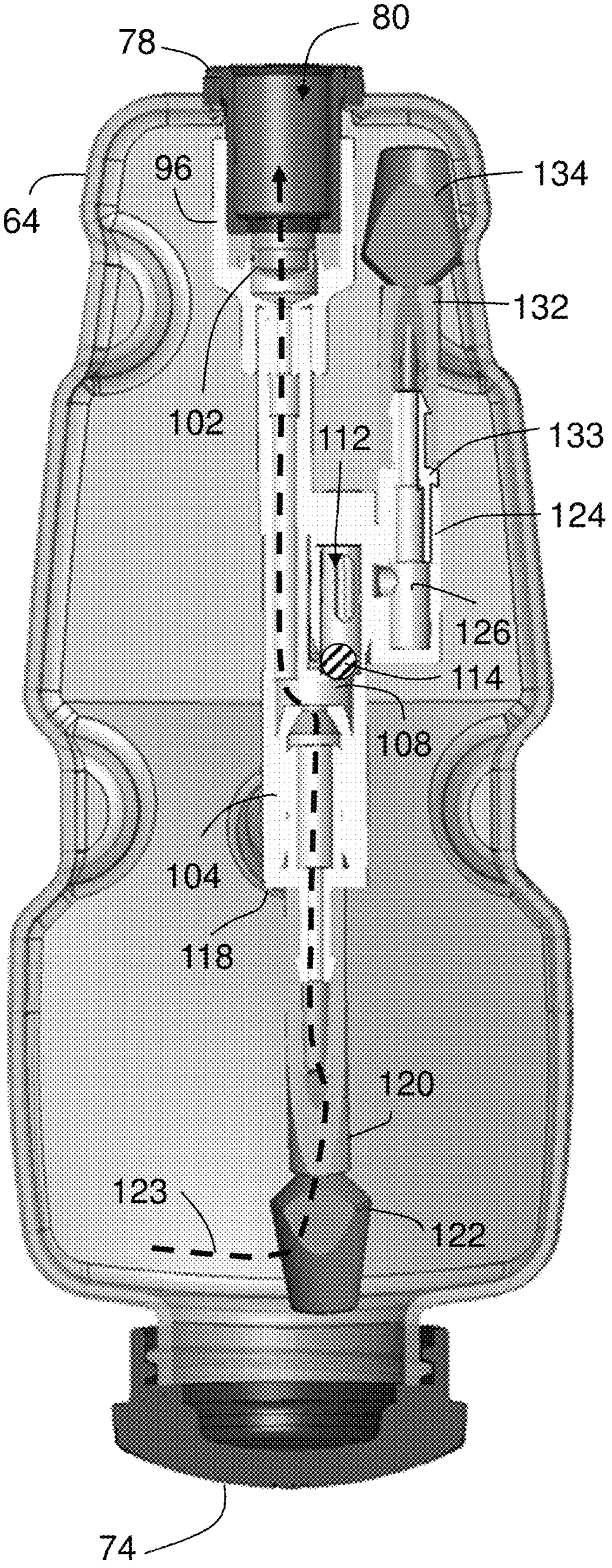
FIG. 15C is a sectional view of the storage container oriented in a position (cleaning element vertically higher) where the cap of the storage container is vertically lower than the output cap.
Figure 16:
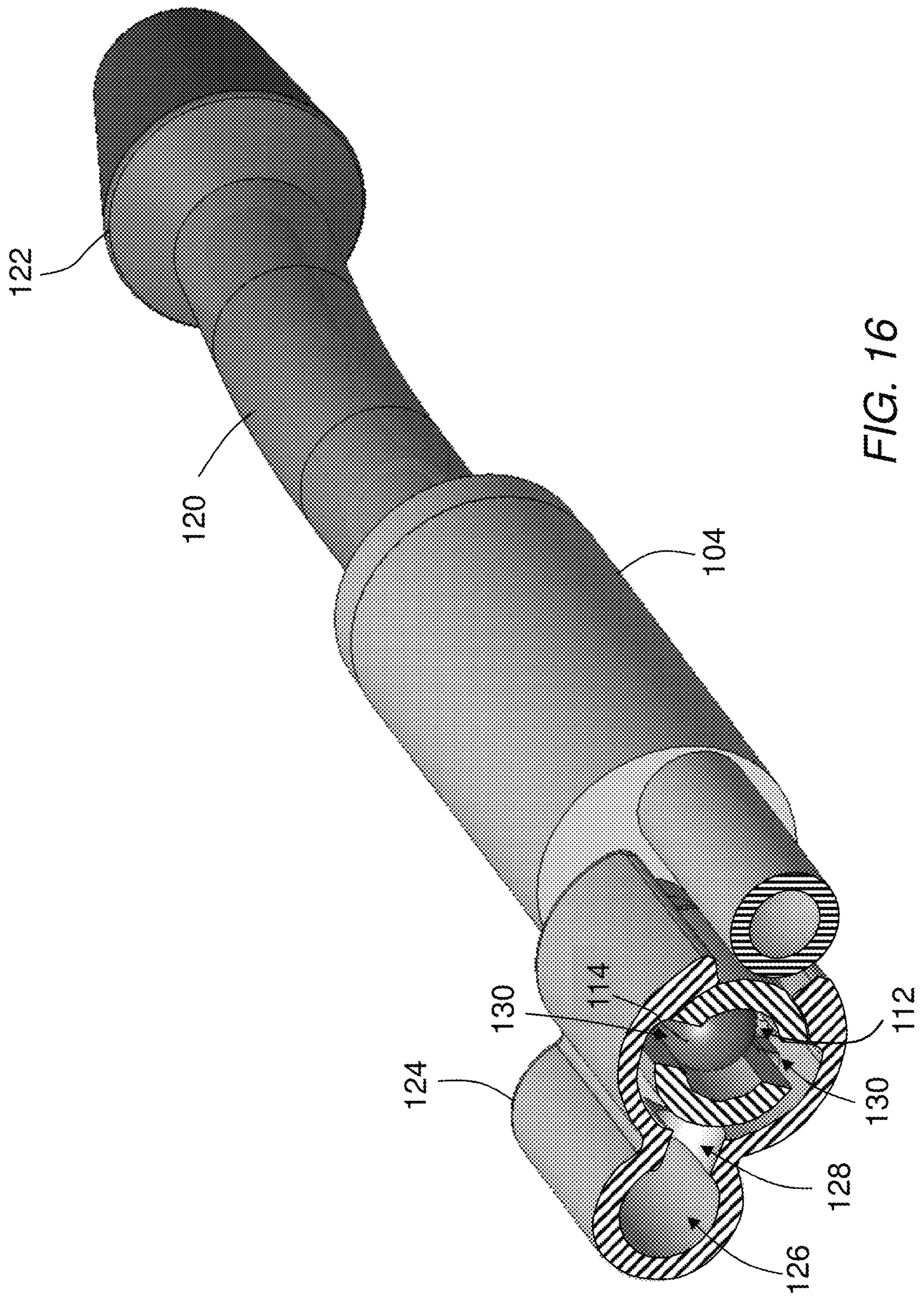
FIG. 16 is another sectional view of the storage container valve assembly of FIG. 11.

It should be appreciated that when the storage container 64 is in the orientation similar to FIG. 15B where the filter 134 is lower than the filter 122, a fluid pathway exists between the filter 122 and the directional chamber 108. Without being constrained or bound by any theory, it is believed that the constant presence of liquid in the valve when drawing cleaning fluid from filter 134 is sufficient enough that it continues to draw cleaning fluid from filter 134 instead of air from filter 122. It should further be appreciated that when the storage container 64 is substantially or completely full, such that the filter 122 is at least partially in fluid communication with the cleaning fluid, then cleaning fluid may be drawn through either or both of filter 122 and filter 134 when the storage container is oriented with the filter 134 lower than the filter 122.

Figure 10:
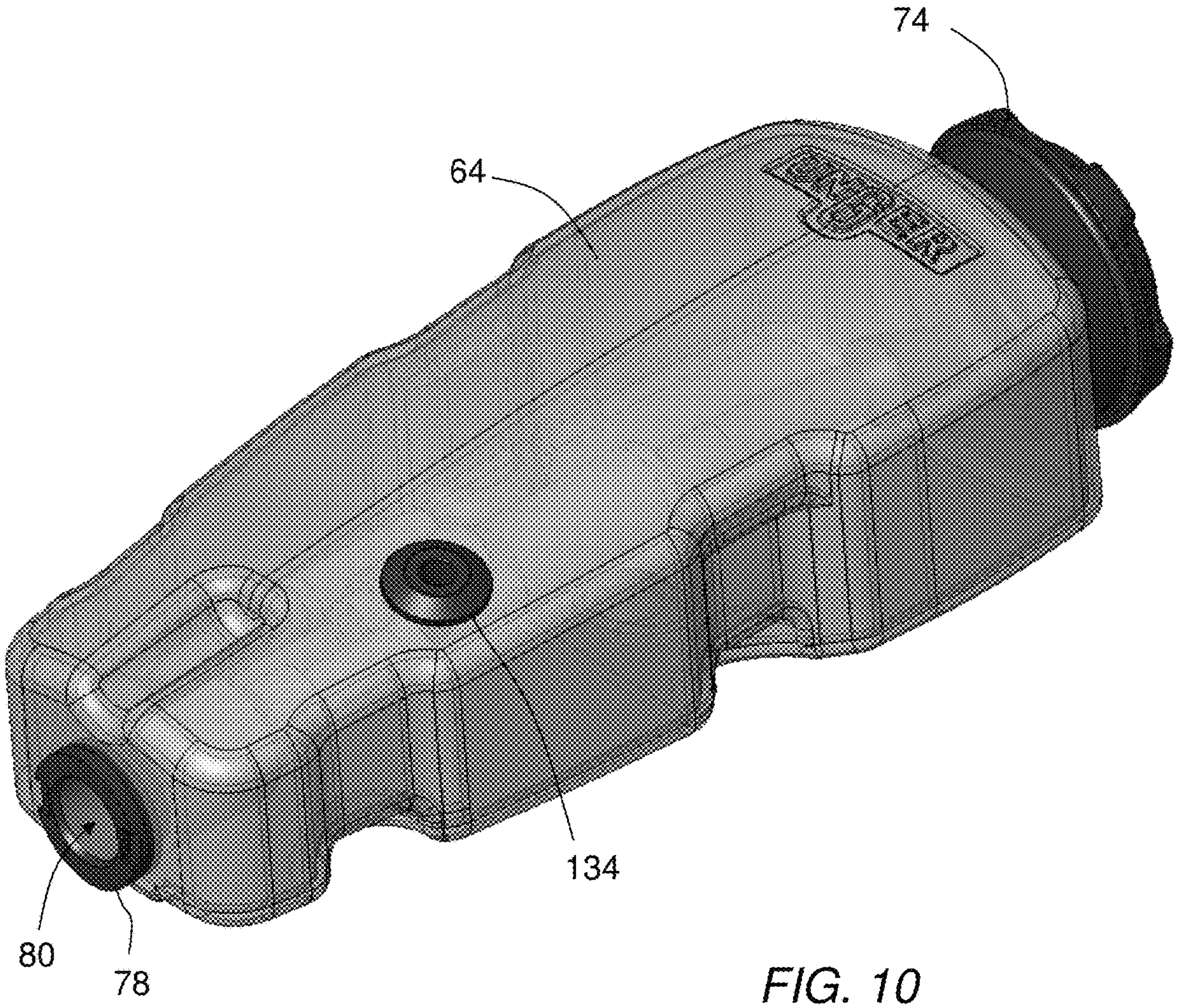
FIG. 10 is a perspective view of a cleaning fluid storage container for use in the assembly of FIG. 7.
Figure 11:
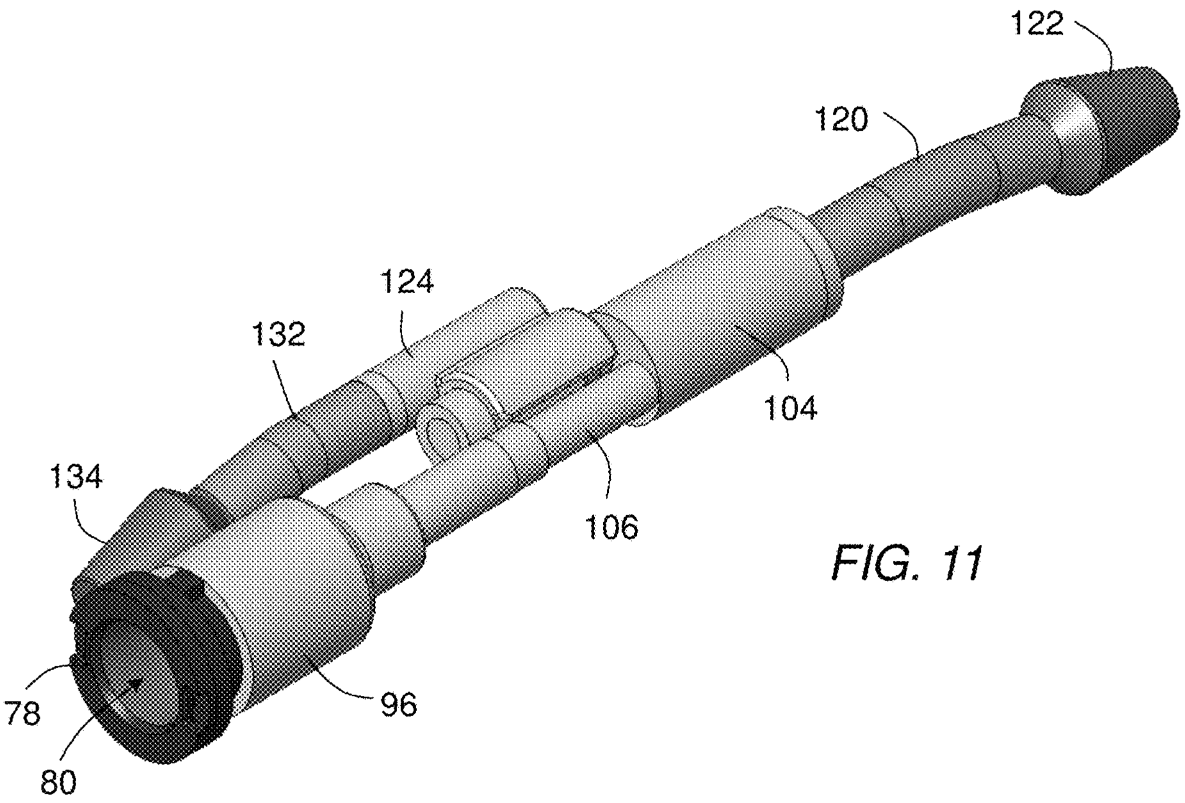
FIG. 11 is a perspective view of a storage container valve assembly for use with the cleaning fluid storage and dispensing assembly of FIG. 7.
Figure 12:
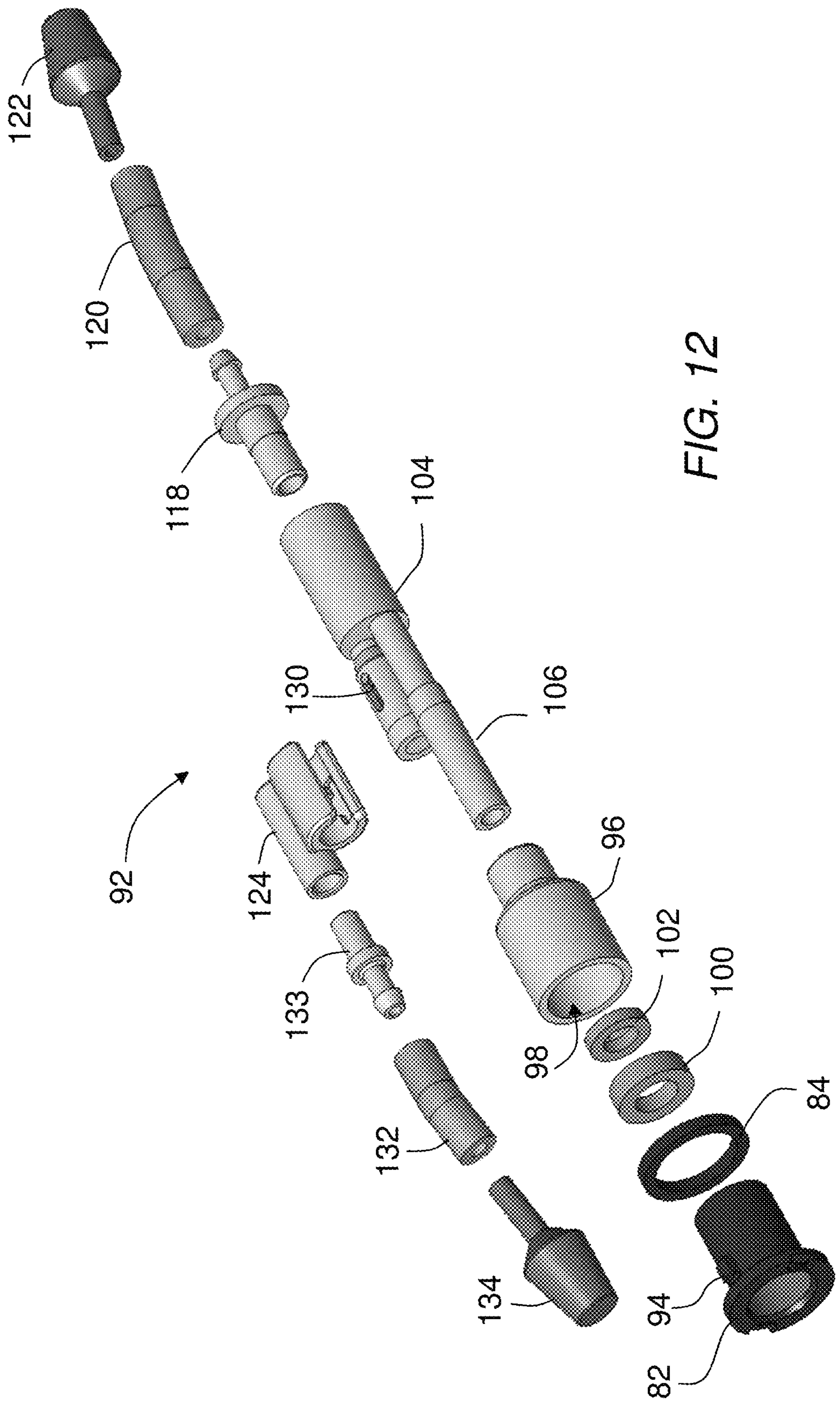
FIG. 12 is a disassembled view of the storage container valve assembly of FIG. 11.
Figure 13:
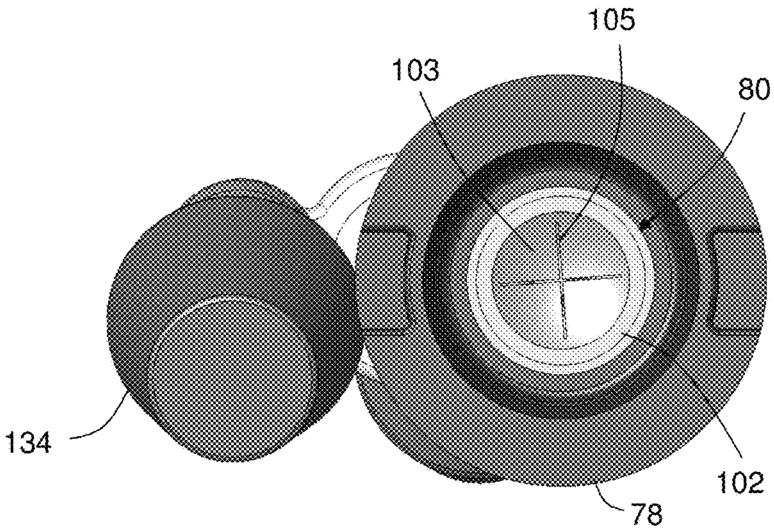
FIG. 13 is an end view of the storage container valve assembly of FIG. 11.
Figure 14:
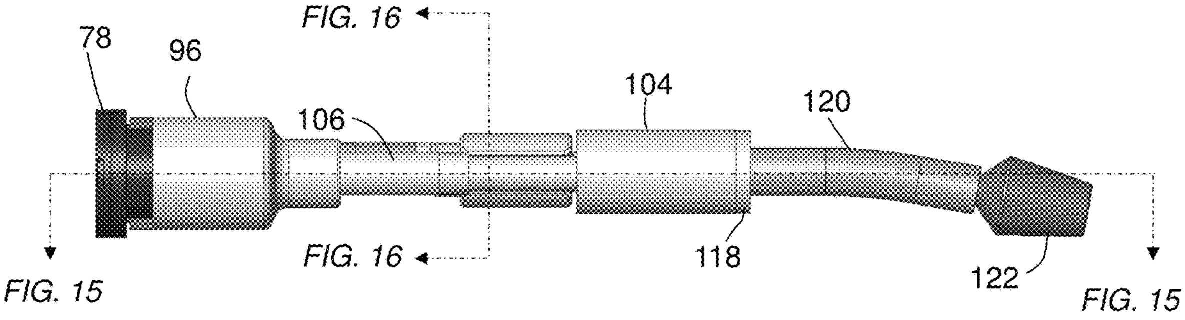
FIG. 14 is a side view of the storage container valve assembly of FIG. 11.
Figure 17:
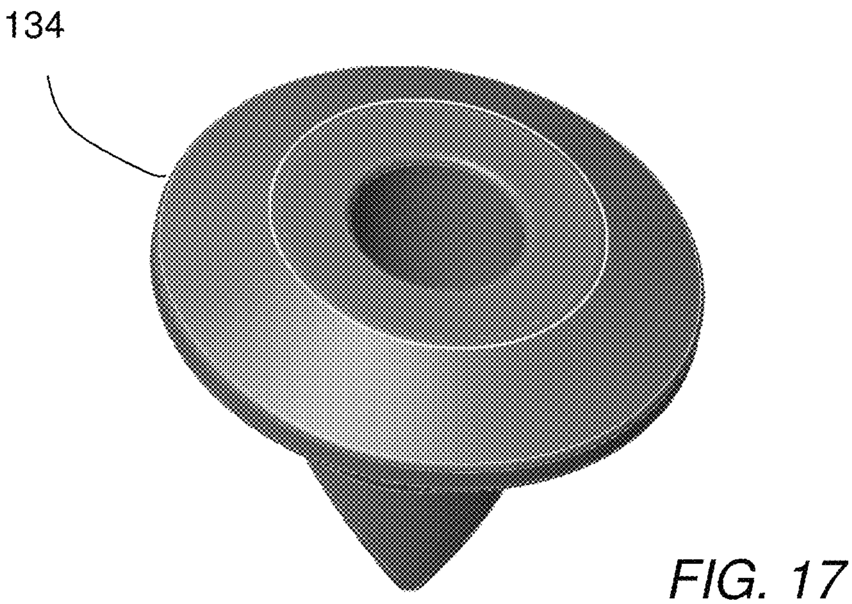
FIG. 17 is a perspective view of a vent device for use with the storage container of FIG. 7.
Figure 18:
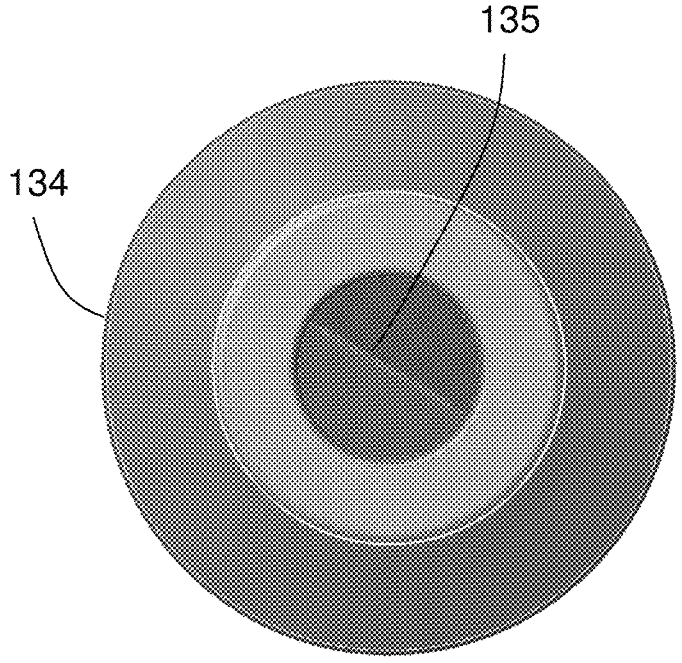
FIG. 18 is a top view of the vent device of FIG. 17.

In one embodiment, shown in FIG. 10 and FIGS. 17-18, the storage container 64 further includes one or more vents 134 that provide an air pathway from the environment to the interior of container 64. It should be appreciated that while the illustrated embodiment shows a single vent 134, this is for exemplary purposes and in other embodiments a plurality of vents positioned at different locations on the container 54 may be provided. In the illustrated embodiment, the vent 134 includes a slit 135 that is configured in a normally closed position (e.g. no air flow). In response to a pressure within the interior 136, falling below a threshold, a portion of the vent 134 deflects, allowing air flow into the interior 136. It should be appreciated that the vent 134 prevents the generation of low pressures (e.g. below ambient) that could interfere with the operation of the pump 66.

When the valve assembly 92 is disposed within the interior 136 (FIG. 9B) of the container 64, with the pivot arm 82 coupled to the container 64, the valve assembly 92 extends along the length of the container 64 with the first filter 122 being disposed adjacent the opening 138 that is enclosed by the cap 74 and the second filter 134 being arranged adjacent the opposite end 76. As will be discussed in more detail herein, the valve assembly 92 is configured to allow the cleaning fluid storage and dispensing assembly 60 to draw cleaning fluid from the interior 136 with the device 20 positioned in any orientation (e.g. cleaning element 42 on a horizontal surface, a vertical surface, an angled surface, a floor, a wall, or a ceiling).

In other embodiments container 64 can be permanently connected via a tube (tether) such that no pivot arm 82 is provided. In this embodiment, the tube 70 connects directly to the output cap 78 and is sized long enough so that the end user can remove the container from the housing to fill the bottle.

In operation, the user first fills the container 64 with the desired cleaning fluid. It should be appreciated that the container 64 may be filled with the cleaning fluid and coupled to the pivot arm 82, or external to the device 20. Once the cap 74 is placed on, the user installs the container 64 (if filled externally) by sliding the pivot arm 82 into the opening 80 in output cap 78. The seal 90 engages the inner surface of the opening 80 to both seal and secure the output cap 78 to the pivot arm 82. It should be appreciated that the coupling of the container 64 to the pivot arm 82 may be performed with the pivot arm 82 rotated relative to a longitudinal axis of the housing 36 or with the pivot arm 82 in the operating position. Once the container 64 is installed, the pivot arm 82 can be rotated to the operating position (FIG. 5) to position the container 64 within the housing 36, and the cover 50 may be installed to enclose the container 64 within the housing 36.

When the user positions the device 20 with the cleaning element 46 vertically below pole 22, such as when cleaning a floor or the bottom of a pane of glass from a standing position for example, the valve assembly 92 is oriented with the second filter 134 being vertically lower than the first filter 122. It should be appreciated that when in this position, the spherical member 114 is positioned with the inlets 130 in an "open" configuration to allow a fluid path from the second filter 134 to the disk valve 102. It should further be appreciated that any cleaning fluid in the container 64 will flow towards the end 76 under the influence of gravity. Thus, unless the storage container 64 is substantially filled with cleaning fluid, the first filter 122 will not be in fluid communication with the cleaning fluid, while the second filter 134 will be in fluid communication with the cleaning fluid. As such, when the pump 66 is operated, the cleaning fluid will flow from the interior 136 through the second filter 134, along the second fluid pathway through the disk valve 102 and into the pump, where it is subsequently flowed to the nozzles 54 via the dispensing tube 46.

Conversely, when the device 20 is reoriented such that the end 76 is vertically higher than the cap 74, the second filter 134 may no longer be in fluid communication with the cleaning fluid since the cleaning fluid will flow to the end of the storage container 64 adjacent the cap 74. It should be appreciated that this orientation may occur when the user is cleaning a higher section of a wall or window, or the ceiling for example. When in this position, the first filter 122 will be in fluid communication with the cleaning solution. Further, when the end 76 is vertically higher than the cap 74, the spherical member 114 will move against the inlet 110 to seal the directional chamber 108 from the ball valve chamber 112. As a result, when the pump 66 is activated, instead of pulling air from the end 76 of the storage container 64, the cleaning fluid will flow into the first filter 122 and along the first fluid pathway to the disk valve 102 and into the pump, where it is subsequently flowed to the nozzles 54 via the dispensing tube 46.

It should be appreciated that the valve assembly 92 provides advantages in allowing the device 20 to be operated in a variety or orientations while still allowing the flow of cleaning fluid from the storage container and the user can use chemical of their choosing.

It should also be noted that the terms "first", "second", "third", "upper", "lower", and the like may be used herein to modify various elements. These modifiers do not imply a spatial, sequential, or hierarchical order to the modified elements unless specifically stated. The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A cleaning device comprising:

a power source;

a pump in selective electrical communication with the power source;

a storage container in fluid communication with the pump, the storage container having a first portion and a second portion;

a cleaning head having a first opening and a spray nozzle, the spray nozzle being in fluid communication with the pump, the spray nozzle being disposed to direct cleaning fluid through the opening;

a valve assembly disposed in the storage container and in fluid communication with the pump and arranged between the pump and the spray nozzle, the valve assembly being configured to selectively flow cleaning fluid from the first portion or the second portion to the spray nozzle; and a cleaning element removably coupled to the cleaning head.

2. The cleaning device of claim 1, wherein the cleaning element is a disposable cleaning element.

3. The cleaning device of claim 1, further comprising an adapter member removably coupled to the cleaning head, wherein the adapter member is configured to removably couple the cleaning element to the cleaning head.

4. The cleaning device of claim 3, wherein the adapter member includes a hook and loop fastener, the cleaning element being removably coupled to the adapter member via the hook and loop member.

5. The cleaning device of claim 3, wherein the adapter member comprises one or more tabs configured to snap fit and couple with the cleaning head.

6. The cleaning device of claim 1, wherein the cleaning element is configured to connect to the cleaning head by one or more straps.

7. The cleaning device of claim 1, wherein the valve assembly includes a first fluid pathway in fluid communication with the first portion and a second fluid pathway in fluid communication with the second portion.

8. The cleaning device of claim 7, wherein the valve assembly comprises a valve fluidly coupled to the first fluid pathway between the first portion and the pump, the valve being configured to selectively fluidly couple the first portion to the pump based at least in part on an orientation of the device.

9. The cleaning device of claim 8, wherein the valve fluidly couples the first portion to the pump when the first portion is vertically lower than the second portion.

10. The cleaning device of claim 8, wherein the valve fluidly decouples the first portion from the pump when the first portion is vertically higher than the second portion.

11. The cleaning device of claim 7, wherein the first fluid pathway comprises a first filter at an end of the first fluid pathway within the storage container and the second fluid pathway comprises a second filter at an end of the second fluid pathway within he storage container.

12. The cleaning device of claim 1, wherein the valve assembly comprises:

a first take-up tube arranged and oriented in a first direction within the storage container; and a second take-up tube arranged and oriented in a second direction within the storage container, the second direction being opposite the first direction, wherein each of the first take-up tube and the second take-up tube are selectively fluidly coupled to the spray nozzle.

13. The cleaning device of claim 12, wherein the first take-up tube comprises a first filter at an end thereof and the second take-up tube comprises a second filter at an end thereof.

14. The cleaning device of claim 12, wherein each of the first take-up tube and the second take-up tube are coupled to a directional flow valve.

15. The cleaning device of claim 14, wherein the directional flow valve comprises a ball valve chamber arranged between the second take-up tube and the spray nozzle.

16. The cleaning device of claim 14, wherein the directional flow valve comprises a directional chamber and a port arranged between the first take-up tube and the spray nozzle.

17. The cleaning device of claim 1, further comprising a vent member fluidly coupled between an interior portion of the storage container and an ambient environment.

18. The cleaning device of claim 1, wherein the storage container includes a removable cap, the cap being sealingly coupled to the storage container.

19. The cleaning device of claim 1, wherein the storage container is made from a substantially rigid material.

20. The cleaning device of claim 1, wherein the cleaning element comprises a central opening that aligns with a central opening of the cleaning head when the cleaning element is attached to the cleaning head.

* * * * *